(12) United States Patent
Koide

(10) Patent No.: US 7,969,996 B2
(45) Date of Patent: Jun. 28, 2011

(54) TUNNELING APPARATUS AND TUNNEL FRAME SORTING METHOD AND ITS PROGRAM FOR USE THEREIN

(75) Inventor: Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 11/817,718

(22) PCT Filed: Feb. 27, 2006

(86) PCT No.: PCT/JP2006/304179
§ 371 (c)(1),
(2), (4) Date: Sep. 4, 2007

(87) PCT Pub. No.: WO2006/093299
PCT Pub. Date: Sep. 8, 2006

(65) Prior Publication Data
US 2009/0080418 A1    Mar. 26, 2009

(30) Foreign Application Priority Data
Mar. 4, 2005    (JP) ................................. 2005-059830

(51) Int. Cl.
*H04L 12/56*    (2006.01)
(52) U.S. Cl. ........ 370/401; 370/410; 370/469; 370/474; 370/475
(58) Field of Classification Search ................... 370/400, 370/401, 410, 469, 474, 475, 389
See application file for complete search history.

(56) References Cited

U.S. PATENT DOCUMENTS

| 5,654,531 A * | 8/1997 | Farabee et al. ................ 187/247 |
| 2003/0114050 A1 * | 6/2003 | Komiya et al. ............... 439/894 |
| 2007/0036115 A1 * | 2/2007 | Ono et al. ..................... 370/338 |

FOREIGN PATENT DOCUMENTS

| JP | 2000-232480 A | 8/2000 |
| JP | 2004-32004 A | 1/2004 |
| JP | 2004-253975 A | 9/2004 |
| JP | 2005-101715 A | 4/2005 |

OTHER PUBLICATIONS

Ruixi Yuan and W. Timothy Strayer "Virtual Private Networks: Technologies and Solutions," Pearson Education Co., Ltd., Japan, 2001, pp. 12-13.
"EtherIP: Tunneling Ethernet (registered trademark) Frames in IP Datagrams"<URL http://www.ietf.org/rfc/rfc3378. txt>, pp. 1-12.
"SoftEther.com—SoftEther Virtual Ethernet (registered trademark) System—SoftEther VPN System" <URL http://www.softether.com/jp/>, pp. 1-10.

* cited by examiner

*Primary Examiner* — Jayanti K Patel
*Assistant Examiner* — Bo Hui A Zhu
(74) *Attorney, Agent, or Firm* — Sughrue Mion, PLLC

(57) ABSTRACT

The present invention provides a tunneling apparatus which can perform tunneling without requiring the network to be suspended or requiring the existing configuration of a local network to be modified. The frame sorting part 11 determines whether or not a frame input from a local network through a physical interface is an encapsulated tunnel frame. If such frame is a tunnel frame, the frame sorting part 11 outputs such frame to the decapsulation unit of the tunneling part 13. If such frame is not a tunnel frame, the frame sorting part 11 outputs such frame to at least one of the address resolution unit of the kernel part 12 and the encapsulation unit of the tunneling part, based on the characteristics of such frame.

15 Claims, 25 Drawing Sheets

TUNNELING APPARATUS AND TUNNEL FRAME SORTING METHOD AND ITS PROGRAM FOR USE THEREIN

TECHNICAL FIELD

The present invention relates to a tunneling apparatus and a tunnel frame sorting method and its program for use therein. More particularly, the present invention relates to a tunneling apparatus which inputs frames to be decapsulated or encapsulated, encapsulates or decapsulates these frames accordingly, and outputs the resultant frames from its physical interface part.

BACKGROUND ART

In intranets, the Internet and other information communication networks, different types of local network, such as subnets operated by corporate business divisions, household networks, and regional networks operated by carriers, are interconnected among one another, the art of tunneling is currently well known as a means to make frames non-transparent when they are transmitted/received over a network. The art achieves this by encapsulating frames to be transmitted/received between two local networks (inner frames) into a different type of frames (outer frames) and sending out these outer frames over the network (refer to Literature 1 for an example).

The tunneling art connects two local networks with each other through a logical link, by which frames flowing through the logical link become non-transparent from outside. Because of this, it becomes possible, for example, to use a communication protocol which is not supported by a network over which frames are transmitted and to encrypt frames to prevent them from being eavesdropped.

A data link layer tunneling technique according to a related art will be described below. FIG. 30 is a diagram showing the content of a frame F6 which is being transmitted/received through a data link layer, such as Ethernet (registered trademark). A data series F1, for example, is transmitted/received by use of HTTP (Hyper Text Transfer Protocol), FTP (File Transfer Protocol) or other application. To a data series F1 is added a transport layer header F2, which contains the control information of the transport layer protocol, such as TCP (Transmission Control Protocol) and UDP (User Datagram Protocol), to perform traffic control specified by the application.

The data series F1 is also added a network layer header F3, which contains, among others, an IP (Internet Protocol) or other logical address defined by a network layer protocol and allocated to each of destination terminals within an information communication network and becomes a packet F5.

In a local network, a packet F5 is added a data link layer header F4 and becomes a frame F6. The data link layer header F4 contains a physical address which is recognizable by terminals, switching hubs and other communication equipment within a local network; this address is defined by a data link layer protocol, such as Ethernet (registered trademark). It is these frames F6 that are actually transmitted/received over the local network.

In a typical data link layer tunneling technique, a frame F6 actually transmitted/received over a local network is regarded to be a data series F1, and creates another frame or packet by further adding various headers, such as a transport layer header, to the data series F1. This process is called "encapsulation." The reciprocal process to take out the original frame F6 is called "decapsulation."

One data link layer tunneling technique according to a related art uses EtherIP data format, as shown in FIG. 31 (refer to Literature 2 for an example). According to Literature 2, EtherIP is a tunneling technique to encapsulate frames of Ethernet (registered trademark), which is a data link layer protocol, into packets of IPv4 (Internet Protocol version 4), which is a network layer protocol.

To an Ethernet (registered trademark) frame F7, which is actually transmitted/received through Ethernet (registered trademark), this technique adds an EtherIP header F8 (the user's own header) and an IP header F9 (a network layer header) to create an IP packet F10.

An Ethernet (registered trademark) frame F7 is inherently valid only within a local network. The original Ethernet (registered trademark) frame F7 is not maintained in its entirety because its MAC (Media Access Control) header (a data link layer header) is discarded when it is transferred to another network by a routing apparatus, such as a router.

Ethernet (registered trademark) supports broadcast transmission and is capable of broadcasting an Ethernet (registered trademark) frame F7 to all the terminals connected to a local network. However, for the reason described above, it cannot transmit the same frame to more than one local network simultaneously, which can be problematic.

In addition, in an IPv4 network whose network layer protocol can transfer IPv4 frames only, other network layer protocols, such as IPX (Internetwork Packet exchange) and AppleTalk (registered trademark), are invalid. This causes a problem that it is not possible to communicate with another local network via an IPv4 network by using IPX, AppleTalk (registered trademark) or other similar protocol.

However, when EtherIP is used, Ethernet (registered trademark) frames for broadcast and Ethernet (registered trademark) frames using IPX, AppleTalk (registered trademark), etc. are all encapsulated into IPv4 packets and can pass through an IPv4 network. Ethernet (registered trademark) frames taken out by decapsulation at a certain local network can be transmitted without any modification at that local network. Using EtherIP thus resolves the above-described problems.

FIG. 32 shows an overall configuration of an information communication network which connects between two local networks through a tunneling apparatus capable of encapsulation and decapsulation by EtherIP.

A tunneling apparatus typically has two separate physical interfaces: one for receiving frames to be encapsulated and the other for receiving frames to be decapsulated. Referring to FIG. 32 as an example, a tunneling apparatus R51 is placed in a local networks R11, with one physical interface connected to a subnet R41 over which Ethernet (registered trademark) frames are transmitted/received and the other to a subnet R45 over which IP packets resulting from encapsulating Ethernet (registered trademark) frames are transmitted/received.

Similarly to the tunneling apparatus R51 described above, a tunneling apparatus R52 is placed in a local networks R12, with one physical interface connected to a subnet R42 over which Ethernet (registered trademark) frames are transmitted/received and the other to a subnet R46 over which IP packets resulting from encapsulating Ethernet (registered trademark) frames are transmitted/received.

An Ethernet (registered trademark) frame transmitted from a terminal R1 in the local networks R11 is received by the tunneling apparatus R51 via the subnet R41. If the Ethernet (registered trademark) frame is an Ethernet (registered trademark) frame to be received by the local network R12, the frame is encapsulated into an IP packet so that it can pass through the Internet R10 and is transmitted by specifying the logical address of the tunneling apparatus R52 in the local network R12. The tunneling apparatus R52 receives the IP packet, decapsulates the IP packet to take out the Ethernet (registered trademark) frame, and transmits the resultant Ethernet (registered trademark) frame to the subnet R42.

In this way, the subnets R41, R42 are logically connected with each other by the tunneling apparatuses R51, R52 through a communication tunnel R50, and the Ethernet (registered trademark) frame is received by the terminal R2 as if it were transmitted directly from the terminal R1. Transmission of an Ethernet (registered trademark) frame from the terminal R2 to the terminal R1 takes place in a similar manner to the above. More specifically, the subnet R41 and the subnet R42 are connected with each other transparently as viewed from their data link layer protocols, and they together behave as if they were one local network.

In the example above, in addition to EtherIP, many other approaches to the encapsulation of a frame of a specific data link layer protocol into a packet of a specific network layer protocol can be applied as the art of tunneling. Examples of these approaches include Ethernet (registered trademark) over HTTPS[HTTP over SSL (Secure Sockets Layer)] (refer to Literature 3 for an example), L2TPv3 (Layer two Tunneling Protocol version 3), and Ethernet (registered trademark) over IPsec, which combines EtherIP and IPsec (IP security protocol). Configurations wherein these approaches are applied are similar to the one described above.

However, in these configurations, the terminal R1 and the terminal R2 are decoupled from and are not able to communicate with the information communication network R10. One common solution to this problem is to set up a policy on the tunneling apparatus as to which frames should be passed as are and which frames should be encapsulated. Another solution is to operate the tunneling apparatus in combination with a firewall. These solutions still present problems in that the existing network must be disconnect for a while and that significant changes are required in the network configuration.

Literature 1: Ruixi Yuan and W. Timothy Strayer "Virtual Private Networks: Technologies and Solutions," Pearson Education Co., Ltd., Japan, 2001

Literature 2: "EtherIP: Tunneling Ethernet (registered trademark) Frames in IP Datagrams"<URL http://www.ietf.org/rfc/rfc3378. txt>

Literature 3: "SoftEther.com-SoftEther Virtual Ethernet (registered trademark) System-SoftEther VPN System"<URL http://www.softether.com/jp/>

A current tunneling apparatus which performs encapsulation of date link layer frames typically has two or more separate physical interfaces: one for receiving frames to be encapsulated and the other for receiving frames to be decapsulated. This is problematic because the network must be disconnected for a while when installing a tunneling apparatus and because the installation and removal of a tunneling apparatus are not simple tasks.

SUMMARY

An exemplary object of the present invention is to solve the above-described problems and to provide a tunneling apparatus and a tunnel frame sorting method and its program for use therein which can perform tunneling without requiring the network to be suspended or requiring the existing configuration of a local network to be modified.

According to a first exemplary aspect of the invention, a tunneling apparatus to transmit/receive a frame which is a data series of a data link layer after encapsulation in tunneling with the other-party apparatus, includes a tunneling unit which includes an encapsulation unit to encapsulate the frame and a decapsulation unit to decapsulate the frame, a kernel unit to process the frame, and a sorting unit which is connected to a local network and which allocates the frame to at least one of the tunneling unit, the kernel unit, and the local network; or discards the frame based on the input path and content of the frame.

According to a second exemplary aspect of the invention, a tunnel frame sorting method used in tunneling with the other-party apparatus to transmit/receive a frame, which is a data series of a data link layer, after encapsulation, wherein the tunneling apparatus performs an encapsulation process to encapsulate the frame and a decapsulation process to decapsulate the frame, a kernel process to process the frame, and a sorting process to allocate the frame to at least one of the tunneling process, the kernel process, and the local network, or discard the frame based on the input path and content of the frame.

According to a third exemplary aspect of the invention, a program which realizes tunnel frame sorting used in tunneling with the other-party apparatus to transmit/receive a frame, which is a data series of a data link layer, after encapsulation, which program makes a computer execute a tunneling process which includes an encapsulation process to encapsulate the frame and a decapsulation process to decapsulate the frame, a kernel process to process the frame, and a sorting process allocate the frame to at least one of the tunneling process, the kernel process, and the local network, or discard the frame based on the input path and content of the frame.

By adopting the configuration and operations as described above, the present invention can provide an effect that tunneling can be performed without requiring the network to be suspended or without requiring the existing configuration of the local network to be modified.

1: tunneling apparatus, 2: tunneling apparatus according to a related art, 3-1, 3-2: router, 4-1 to 4-M, 5-1 to 5-N: terminal, 6: firewall, 11: frame sorting part, 12: kernel part, 12a: kernel part (ARP), 13: tunneling part, 14: CPU, 15: main memory, 15a: control program, 16: storage apparatus, 17: interface part, 100: the Internet, 111,113: frame sorting unit, 112: switch unit, 114: kernel part (stack), 161 to 163: path (#1 to #3) address tables, 201, 202: local network

EXEMPLARY EMBODIMENT

Figure 1:
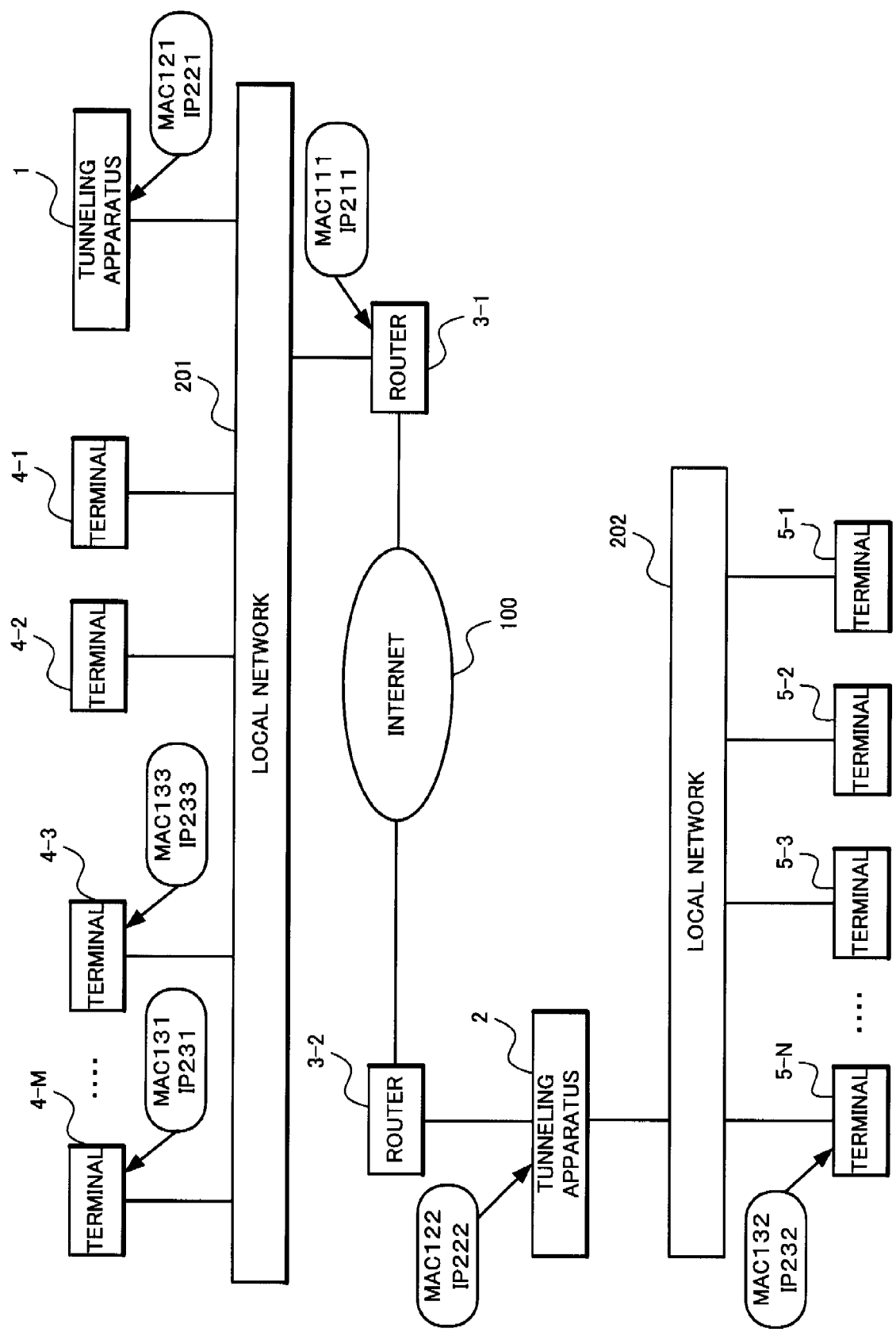
FIG. 1 is a block diagram showing the configuration of a network according to an exemplary embodiment of the present invention.

An exemplary embodiment of the present invention will now be described with reference to the drawings. FIG. 1 is a block diagram showing the configuration of a network according to the exemplary embodiment of the present invention. FIG. 1 shows the configuration of a network, wherein local networks 201, 202, which are configured in accordance with the Ethernet (registered trademark) II standard, are connected with each other by using a tunneling apparatus 1 and a related-art-based tunneling apparatus 2.

As shown in FIG. 1, the local network 201 has the tunneling apparatus 1, a router 3-1, and terminals 4-1 to 4-M connected thereto, while the local network 202 has the tunneling apparatus 2 and terminals 5-1 to 5-N connected thereto. The tunneling apparatus 2 is connected to the router 3-1 via the Internet 100 and a router 3-2.

Figure 2:
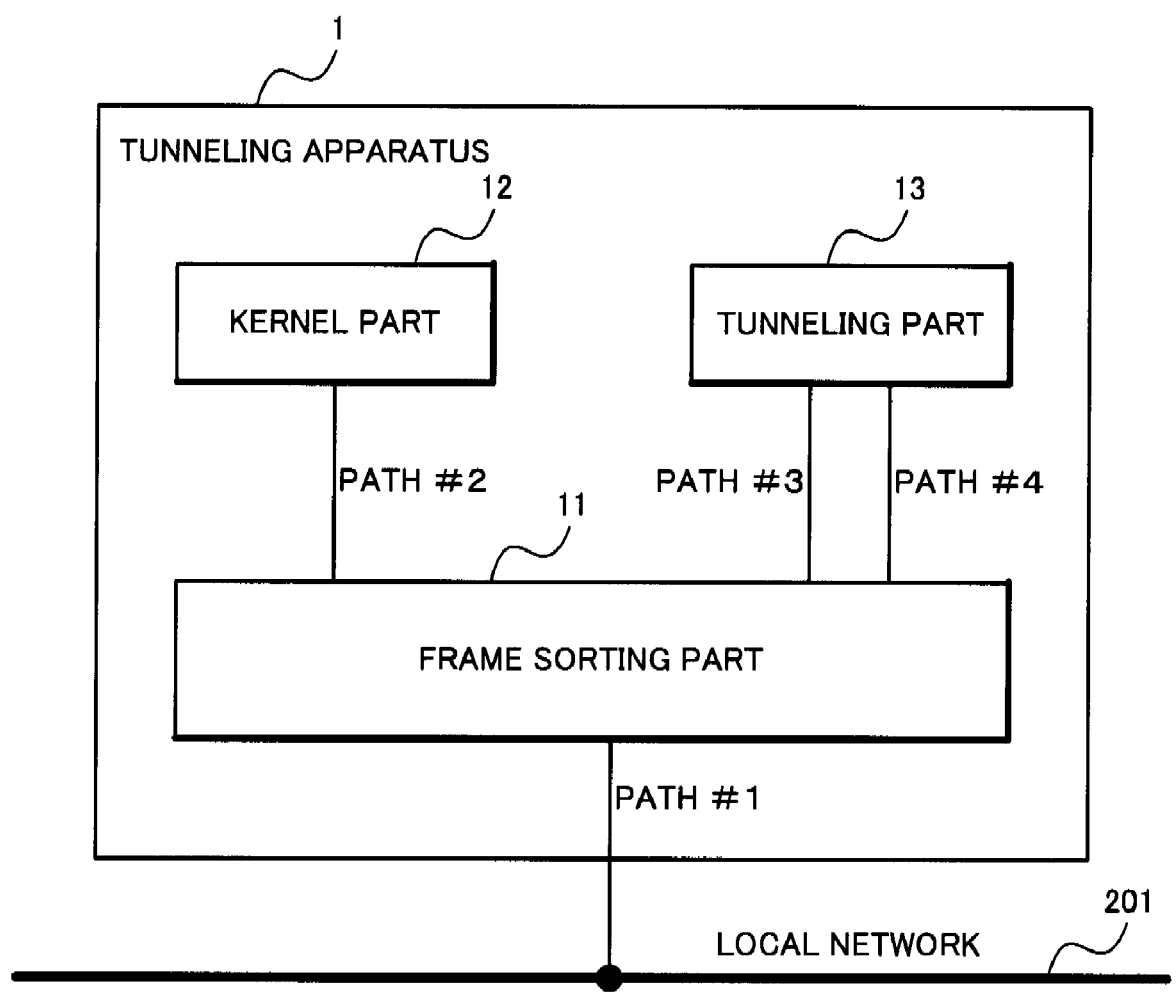
FIG. 2 is a block diagram showing the functional configuration of a tunneling apparatus of FIG. 1.

FIG. 2 is a block diagram showing the functional configuration of the tunneling apparatus 1 of FIG. 1. In FIG. 2, the tunneling apparatus 1 comprises a frame sorting part 11, a kernel part 12, and a tunneling part 13. The frame sorting part 11 is provided with a path #1 through which to be connected to the local network 201; a path #2 through which to be connected to a kernel part 12; a path #3 to exchange non-tunnel frames (i.e., non-encapsulated frames) with the tunneling part 13; and a path #4 to exchange tunnel frames (i.e., encapsulated frames) with the tunneling part 13.

The tunneling part 13 encapsulates and decapsulates data link layer frames when transmitting/receiving these frames via the local network 201. The kernel part 12 processes frames to be processed by own apparatus, including physical address resolution request frames to retrieve a physical address based on the logical address of own apparatus. The frame sorting part 11 sorts input frames into at least tunnel frames and non-tunnel frames and allocates the resultant frames to the tunneling part 13 and the kernel part 12.

By adopting the configuration as described above for the tunneling apparatus 1, the exemplary embodiment of the present invention can properly sort data link layer frames which are input from the same interface into frames to be processed by own apparatus, frames to be transmitted after encapsulation, and frames to be transmitted after decapsulation, and then perform encapsulation or decapsulation of frames and process frames, including physical address resolution request frames, to be processed by own apparatus, thereby making it possible to perform tunneling without requiring the network to be suspended or requiring the existing configuration of the local network 201 to be changed.

In other words, by adopting the above-described configuration, it becomes possible for the tunneling apparatus 1 according to the exemplary embodiment of the present invention to have only one physical interface connected to a local network, properly sort frames received from the same physical interface into frames to be processed by own apparatus, frames to be transmitted after encapsulation, frames to be transmitted after decapsulation, etc., process these frames accordingly, and transmit the resultant frames from the same physical interface, without requiring the network to be suspended or without needing to modify the existing configuration of the local network 201.

First Exemplary Embodiment

Figure 3:
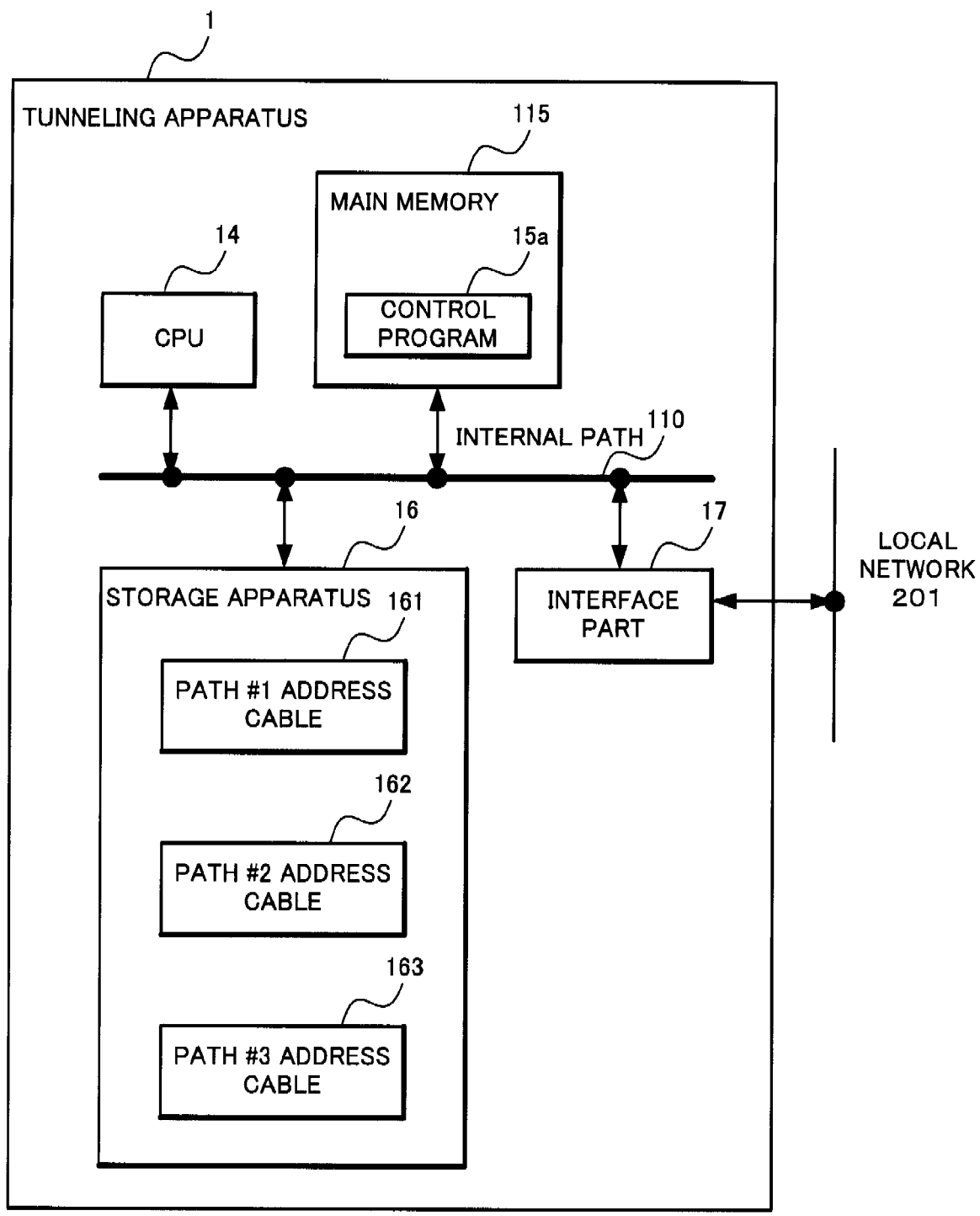
FIG. 3 is a block diagram showing the configuration of a tunneling apparatus according to a first exemplary embodiment of the present invention.

FIG. 3 is a block diagram showing the configuration of a tunneling apparatus according to a first exemplary embodiment of the present invention. A network according to the first exemplary embodiment of the present invention has the same configuration as the network according to the exemplary embodiment of the present invention shown in FIG. 1, and a tunneling apparatus comprising the network has the same functions as the tunneling apparatus shown in FIG. 2 according to the exemplary embodiment of the present invention.

In FIG. 3, the tunneling apparatus 1 according to the first exemplary embodiment of the present invention comprises a CPU (central processing unit) 14; a main memory 15 which stores a control program 15a to be executed by the CPU 14; a storage apparatus 16 which stores path (#1 to #3) address tables 161 to 163, wherein the physical addresses are held for the paths #1 to #3 shown in FIG. 2; and an interface part 17, which is a physical interface to be connected to a local network 201.

The tunneling apparatus 1 according to the first example of the present invention realizes the processing of each of the functions of the frame sorting part 11, the kernel part 12, and the tunneling part 13 shown in FIG. 2 by causing the CPU 14 to run the control program 15a and thereby executing the processes using the path (#1 to #3) address tables 161 to 163 in the storage apparatus 16. In the description below, the first exemplary embodiment of the present invention will be described, with focus on the functions of the frame sorting part 11, the kernel part 12, and the tunneling part 13.

Figure 4:
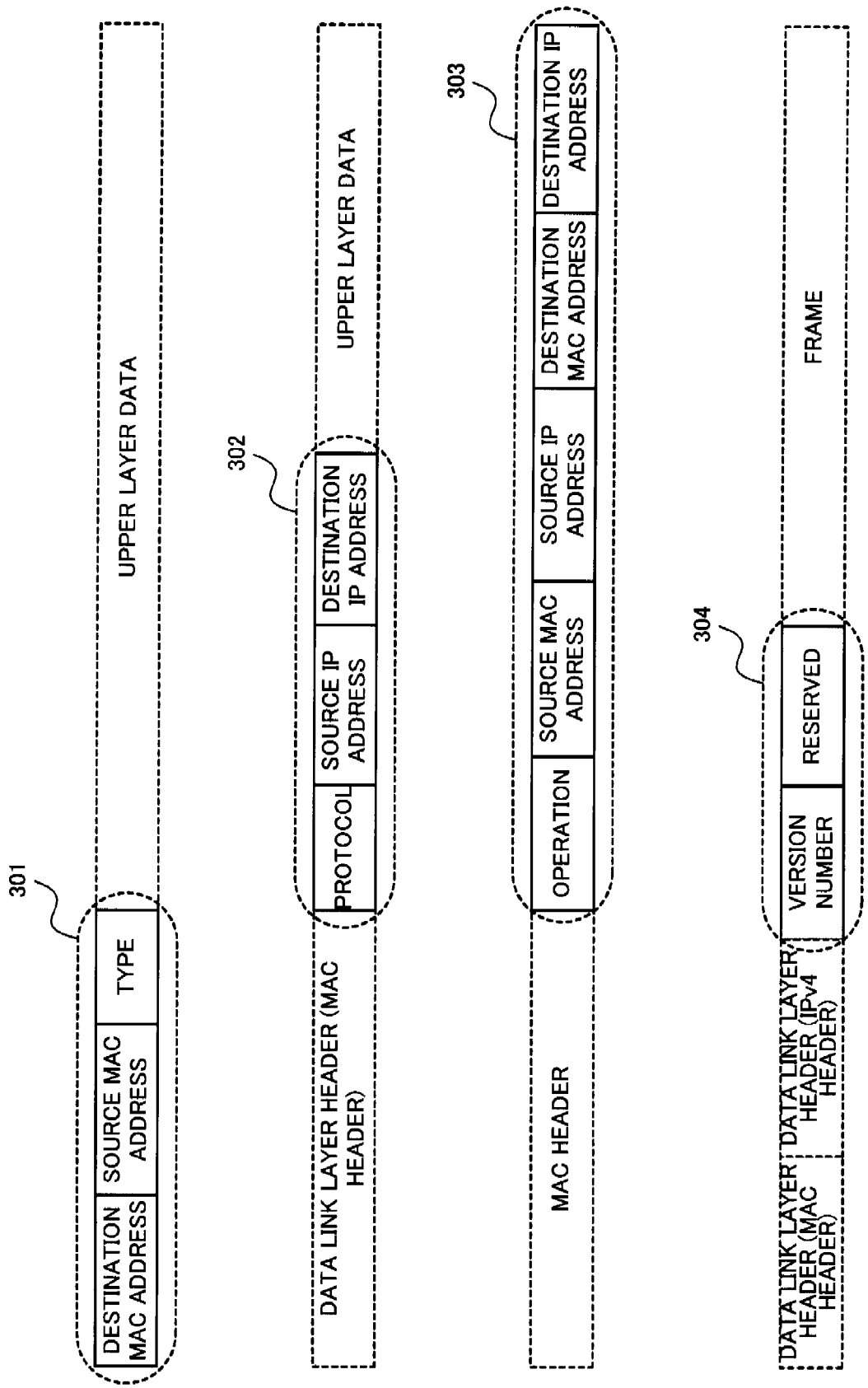
FIG. 4 is a diagram showing the format of a frame which is transmitted/received when EtherIP is used as an encapsulation means for the tunneling part in the network configuration according to the first exemplary embodiment of the present invention.
Figure 5:
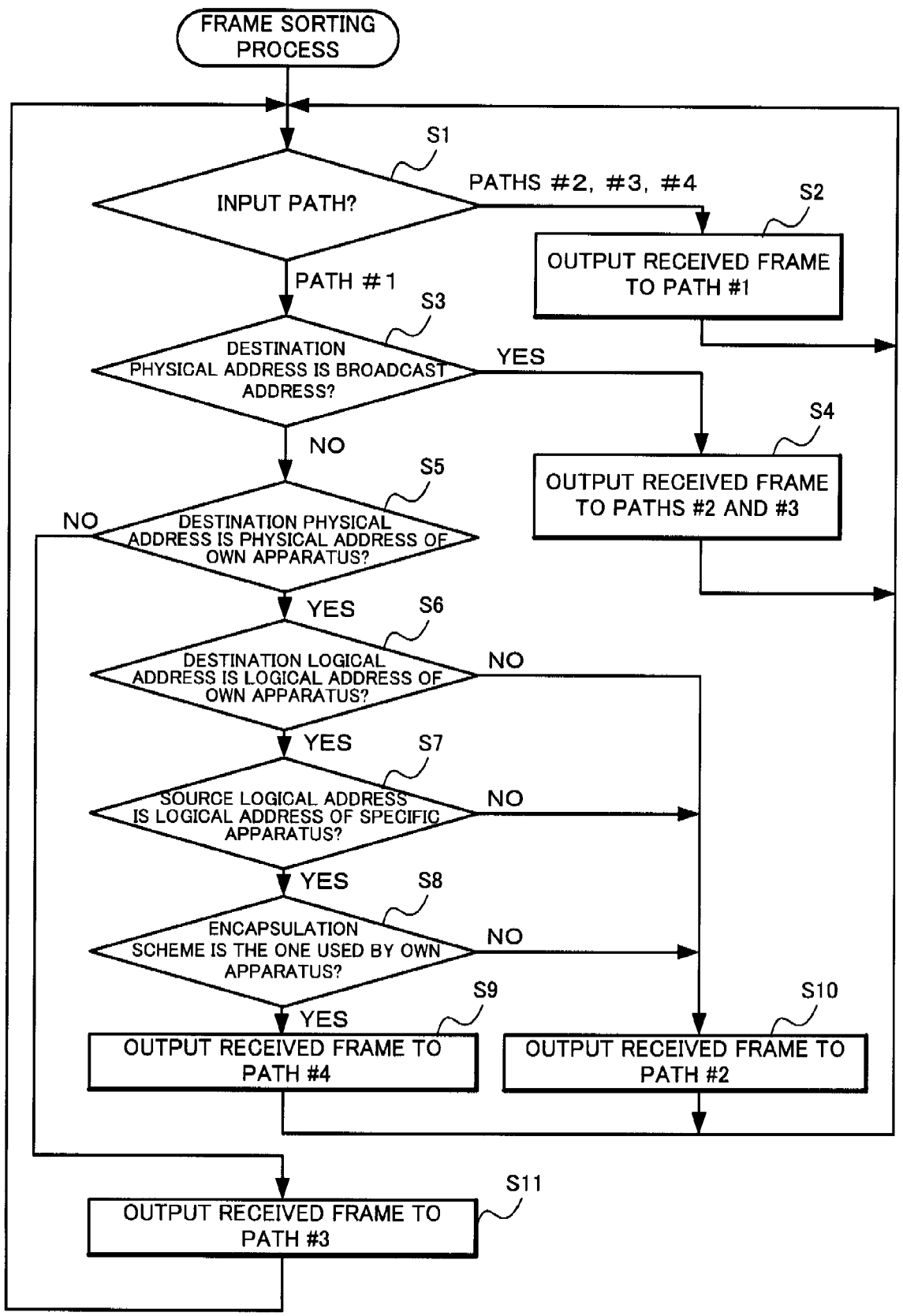
FIG. 5 is a flow chart showing the frame sorting process performed by a frame sorting part according to the first exemplary embodiment of the present invention.

FIG. 4 is a diagram showing the format of a frame which is transmitted/received when EtherIP (Internet Protocol) is used as an encapsulation means for the tunneling part 13 in the network configuration according to the first exemplary embodiment of the present invention. FIG. 5 is a flow chart showing the frame sorting process performed by the frame sorting part 11 according to the first exemplary embodiment of the present invention. The operation of the tunneling apparatus 1 according to the first exemplary embodiment of the present invention will now be described by referring to FIGS. 1 and 5. The process shown in FIG. 5 is achieved when the control program 15a is executed by the CPU 14.

While the description below assumes that the local networks 201, 202 support the Ethernet (registered trademark) II standard and that the network which connects between the local networks 201, 202 is the Internet 100 based on IPv4 (Internet Protocol version 4), the Ethernet (registered trademark) II standard can be replaced with any other data link layer protocol and IPv4 with any other network layer protocol.

First, the frame format commonly used in the Internet will be described with reference to FIG. 4. The MAC header 301 in FIG. 4 is the header of a data link layer frame. This is an area which commonly exists at the start of all frames actually transmitted/received over the local networks 201, 202 configured based on the Ethernet (registered trademark) II standard. The MAC header 301 includes three fields: "destination MAC (Media Access Control) address" and "source MAC address," which are primarily physical addresses, and "type," which indicates the type of the upper layer.

All frames transmitted from the tunneling apparatuses 1, 2 to the local networks 201, 202 are received by all the terminals 4-1 to 4-M, 5-1 to 5-N. In between, there exists a relay apparatus which checks the "destination MAC address" of each frame when relaying it, so as to increase transfer efficiency by preventing unnecessary frames from being relayed. Each of the apparatuses connected to the local networks 201, 202 holds a MAC address, which is a physical address. When the apparatus receives a frame from its own physical interface, it performs a reception process if the "destination MAC address" represents that of own apparatus or a broadcast address.

This mechanism allows each of the apparatuses connected to the local networks 201, 202 to transmit a frame in which the MAC address of the target apparatus is specified in the "destination MAC address" field of the MAC header 301 and get the frame received by the target apparatus.

The IPv4 header 302 is an area specified following the MAC header 301 to serve as the header of a network layer packet. The presence of IPv4 header 302 at this position is indicated by "0x0800" specified in the "type" in the MAC header 301. The IPv4 header 302 includes three fields: "protocol," which primarily represents the type of the upper layer protocol, "source IP address," which represents a logical address, and "destination IP address."

The Internet 100 is a collection of local networks. The transmission range by specifying a MAC address is inherently limited to within each local network, so the routers 3-1, 3-2, which are routing apparatuses to connect the local networks 201, 202 with each other, are used to enable the local networks 201, 202 to communicate with each other using IP addresses. Every time it receives a frame, each of the routers 3-1, 3-2 checks the "destination IP address" field of the IPv4 header 302 and transmits the frame to the most appropriate next router. The destination or source MAC address of each of the routers 3-1, 3-2 destination varies from one frame to another, and thus the content of the MAC header 301 changes accordingly. Data ultimately arrives at and is received by the target apparatus with the specified IP address. In this way, one can transmit data to an apparatus in a remote local network by using an IP address.

The ARP (Address Resolution Protocol) 303 is a data area specified following the MAC header 301. The presence of ARP header 303 at this position is indicated by "0x0806" specified in the "type" field of the MAC header 301. The ARP 303 serves the roles of a physical address resolution request frame and a physical address resolution response frame, and includes five fields: "operation," which primarily indicates whether this frame is a request or a response, "source MAC address," "source IP address," "destination MAC address," and "destination IP address." This header is used to find the MAC address of an apparatus from the known IP address of the apparatus.

An ARP 303 cannot be used simultaneously with an IPv4 header 302. Therefore a frame with an APR 303 is valid only within a local network 201 or 202. An apparatus which needs to find the MAC address of another apparatus transmits a frame to the local networks 201, 202 by including in the frame its own MAC address and IP address as a source MAC address and a source IP address, including the IP address of the target apparatus as a destination IP address, creating an ARP 303 with the "operation" field set to "request," and specifying the "broadcast" in the "destination address" field of the MAC header 301.

Each of the receiving apparatuses compares the destination IP address with its own IP address. If the two IP addresses do not match, the apparatus discards the frame. If the two IP addresses match, the apparatus creates a new frame from the received frame by including its own MAC address and IP address as a source MAC address and a source IP address, creating a new ARP 303 wherein the destination MAC address and the destination IP address are the received ARP 303's source MAC address and source IP address, respectively, and the operation is "response," and specifying the received APR 303's source MAC address in the "destination address" field of the MAC header 301, and transmits the resultant frame to the local networks 201, 202. By this, the target MAC address is returned in a reply frame and the original apparatus needing to find such MAC address gets the MAC address.

The EtherIP header 304 is a header following the IPv4 header 302. The presence of the EtherIP header 304 at this position is indicated by "0x61" specified in the "protocol" field of the IPv4 header 302. A version number is the only content of the EtherIP header 304; there is no field that must be set in this header.

After the EtherIP header 304, there follows the MAC header 301. This means that, when the EtherIP header 304 is used, a frame to be transmitted/received over the local networks 201, 202 can be immediately included as data and transmitted to the specified IP address.

Using this scheme, frame encapsulation is achieved by creating a new frame having a received frame included after the EtherIP header 304, and decapsulation by taking out the frame subsequent to the EtherIP header 304 within the received frame.

The frame sorting part 11 is connected to the local network 201 and transmits and receives Ethernet (registered trademark) frames, which are data series of a data link layer that are transmitted/received by the local network 201. On receiving a frame containing an Ethernet (registered trademark) frame through any of the paths #1 to #4, the frame sorting part 11 determines through which of the paths #1 to #4 the frame has been input (step S1 in FIG. 5).

The frame sorting part 11 outputs the frame to the path #1 (step S2 in FIG. 5) if it is found that the frame has been input through any of the paths #2 to #4. More specifically, the frame sorting part 11 outputs frames to be input through the path #2 after being processed by the kernel part 12, frames to be input through the path #3 after being decapsulated by the tunneling part 13, and frames to be input through the path #4 after being encapsulated by the tunneling part 13, immediately to the local network 201 through the path #1.

When a frame is input through the path #1, the frame sorting part 11 outputs the frame to the paths #2, #3 (step S4 in FIG. 5) if the destination physical address of the frame is found to be a broadcast address (step S3 in FIG. 5), because the frame is a broadcast or multi-cast frame.

The frame sorting part 11 outputs the frame to the path #4 (step S9 in FIG. 5) if the frame is from the tunneling apparatus 2 to which the frame is to be tunneled. This can be determined by checking that all of the following conditions are met: the destination physical address of the frame is not a broadcast address; the destination physical address is the physical address of own apparatus (step S5 in FIG. 5); the destination logical address is the logical address of own apparatus (step S6 in FIG. 5); the source logical address is the logical address of the specific apparatus (step S7 in FIG. 5); and the encapsulation scheme used in the frame is the same as the scheme used by own apparatus (step S8 of FIG. 5).

The frame sorting part 11 outputs the frame to the path #2 (step S10 in FIG. 5) if the destination physical address is the physical address of own apparatus (step S5 FIG. 5) but if the conditions described above are not met by any of the destination logical address, the source logical address, or the encapsulation scheme used in the frame.

Finally, the frame sorting part 11 outputs the frame to the path #3 (step S11 of FIG. 5) if the destination physical address is not the physical address of own apparatus (step S5 in FIG. 5), and causes the frame to be encapsulated by the tunneling part 13. The encapsulated frame is input to the frame sorting part 11 through the path #4 and output to the local network 201 from the frame sorting part 11 through the path #1.

By having the characteristics as described above, it becomes possible for the tunneling apparatus 1 according to this exemplary embodiment to operate simply by being connected to the local network 201, without requiring the network configuration to be modified, which is quite in contrast to the tunneling apparatus 2 according to the related art which requires one to temporarily disconnect the network between the local network 202 and the router 3-2 and place the tunneling apparatus 2 therebetween.

As described above, the tunneling apparatus 1 comprises a frame sorting part 11, one or more tunneling parts 13, and a kernel part 12. The frame sorting part 11 has only one physical interface (shown as the path #1 in FIG. 2) and receives and transmits all frames therethrough. More specifically, the frame sorting part 11 receives frames to be transmitted from the local network 201 to the local network 202 after encapsulation, encapsulated frames to be transmitted from the tunneling apparatus 1, and frames transmitted to the tunneling apparatus 1 through the one physical interface, and transmits decapsulated frames, encapsulated frames, and frames to be transmitted from the tunneling apparatus 1 itself through the same physical interface.

To be further specifically, the frame sorting part 11 receives Ethernet (registered trademark) frames from the local network 201 and transmits the Ethernet (registered trademark) frames input from the paths #2 to #4 to the local network 201, all through the physical interface.

A general physical interface retains a MAC address as its own physical address, and receives frames only if the destination MAC address is either the MAC address of own equipment or a broadcast address. In contrast to this, the physical interface of the tunneling apparatus 1 receives all Ethernet (registered trademark) frames as are and outputs them to the frame sorting part 11.

The frame sorting part 11 determines whether or not each of the Ethernet (registered trademark) frames input through the physical interface is an encapsulated tunnel frame. The frame sorting part 11 outputs the Ethernet (registered trademark) frames determined to be tunnel frames to the tunneling part 13 through the path #4, and outputs the frame determined otherwise to the tunneling part 13 through the path #3 and also to the kernel part 12 through the path #2.

The method used by the frame sorting part 11 to determine whether a frame is a tunnel frame or not varies depending on the type of art based on which the tunneling of the frame has been performed. In most cases, however, a frame is determined to be a tunnel frame if all of the following conditions are met: the destination address in the data link layer header is the physical address of own apparatus; the source address in the network layer header is the logical address of the other-party tunneling apparatus 2 which has tunneled the frame; and the type of the frame, that is, the characteristic shown in the area subsequent to the network layer header, is specific to the tunneling art.

Taking the tunneling apparatus 1 which encapsulates IPv4 packet in accordance with EtherIP as an example, the frame sorting part 11 determines a received frame to be a tunnel frame if the destination MAC address of the frame is the MAC address of the tunneling apparatus 1 itself, the source IP address is the IP address of the tunneling apparatus 2, and the protocol number in the IPv4 header is "0x61."

A special care is necessary if Ethernet (registered trademark) frames are encapsulated into a protocol whose intended use differs from the Ethernet (registered trademark) protocol, such as HTTPS [HTTP (Hyper Text Transfer Protocol) over SSL (Secure Sockets Layer)]. HTTPS is a protocol developed by combining the HTTP protocol, which is used for transmitting/receiving data between a Web server and a browser or other client, and an encryption scheme.

If encapsulation of Ethernet (registered trademark) frame is being performed using HTTPS, there arises a problem that frames which are desirably exchanged in HTTPS communication between the tunneling apparatus 1 and the tunneling apparatus 2 are inappropriately determined to be tunnel frames.

There are several possible solutions for the frame sorting part 11 to avoid this problem. The first of such solution is to first output all HTTPS frames to the tunneling part 13; the tunneling part 13 performs decapsulation on these frames, and returns those that remain non-decapsulated to the frame sorting part 11, which in turn outputs these frames to the path #2. The second solution which can be taken by the frame sorting part 11 is to tentatively carry out the decapsulation process in place of the tunneling part 13 to make a decapsulatable or non-decapsulatable determination. The third solution is to extract a characteristic which makes an encapsulated HTTPS frame distinctive from other HTTPS frames.

Also, the use of Tag VLAN (Virtual Local Area Network) as the art of tunneling helps the frame sorting part 11 solve this problem. In this case, an Ethernet (registered trademark) frame can be determined to be a tunnel frame if it contains a tag VLAN.

The frame sorting part 11 stores the source MAC addresses of frames which are input through the paths #1 to #3 in the aforementioned path (#1 to #3) address tables 161 to 163 in the storage apparatus 16. Before outputting a frame, the frame sorting part 11 searches the path (#1 to #3) address table 161 to 163 to find its destination MAC address.

If the target destination MAC address is found, the frame sorting part 11 outputs the frame to any of the paths #1 to #3 which corresponds to the path (any of #1 to #3) address table 161, 162, or 163 containing the target destination MAC address. If the target destination MAC address (or a broadcast address) is not found, the frame sorting part 11 outputs the frame to all of the paths #1 to #4, except for the path through which the frame has been input.

If more than one tunneling part 13 exists, these are handled separately from each other. For example, a frame input from the first tunneling part may be output to the second tunneling part.

In the path #2 address table 162, the MAC address of the tunneling apparatus 1 is stored in a fixed association with the tunneling apparatus 1. By this, it can be ensured that non-tunnel frames which have been sent to the tunneling apparatus 1 are output to the kernel part 12.

Frames sent out from the local network 202, which is a remote location, are handled in the same manner as the above. For example, a frame transmitted from any of the terminals 5-1 to 5-N in the local network 202 by specifying the MAC address of the tunneling apparatus 1 as the destination undergoes the following process: The frame is first encapsulated by the tunneling apparatus 2, is received by the tunneling apparatus 1, is decapsulated by the tunneling part 13, and then is output to the kernel part 12.

Furthermore, if the kernel part 12 outputs in reply to the frame a new frame having the original frame's source MAC address as the destination MAC address, the new frame is output to the tunneling part 13 (through the path #3) and is encapsulated thereat, because the MAC address has been stored in the path #3 address table 163. The new frame is ultimately received by the target terminal in the local network 202.

If two or more tunneling parts 13 exist, these are distinguished from each other and stored as different destinations in the path #3 address table 163. If the same MAC address is already stored in another path address table, this MAC address is deleted. MAC addresses which have not been registered for a pre-determined period of time are also deleted.

The operations performed by the frame sorting part 11 in combination with the afore-described path (#1 to #3) address tables 161 to 163 are similar to those of a general switching hub, except in that the frame sorting part 11 does not output to the kernel part 12 those frames whose destination MAC address is neither the MAC address of the tunneling apparatus nor a broadcast address. By this, unnecessary frames can be prevented from being output to kernel part 12.

The tunneling part 13 comprises an encapsulation unit and a decapsulation unit, and outputs frames input from the frame sorting part 11 through the path #3 to the encapsulation unit and frames input from the frame sorting part 11 through the path #4 to the decapsulation unit.

The encapsulation unit encapsulates each of the input frames into a frame having the IP address of the tunneling apparatus 2 to which to connect to as the destination IP address and outputs the resultant frame to the path #4. The decapsulation unit decapsulates the input frames and outputs the resultant frames to the path #3.

The tunneling part 13 is not limited to one in number but a plurality of them can exist. In addition, the plurality of tunneling parts 13 can implement different tunneling schemes from each other. These tunneling parts 13 may be connected to different destinations. It is therefore possible, for example, to implement tunneling parts 13 for relaying a plurality of tunneling apparatuses, for relaying different tunneling schemes, and for other purposes.

As mentioned in the description of the frame sorting part 11, if a non-decapsulatable frame is input, the decapsulation unit may return the frame to the frame sorting part 11.

The kernel part 12 appropriately processes frames input from the frame sorting part 11 for processing by the tunneling apparatus 1, outputs and transmits the results of the processing to the frame sorting part 11, and performs some other processes. The kernel part 12 may also be used to output and transmit any form of notification, such as error or traffic reports, from the tunneling apparatus 1.

The processes performed by the kernel part 12 include the following: transmission of a physical address resolution response frame in response to a physical address resolution request frame received from the local network 201 or 202; transmission of a physical address resolution request frame to acquire the physical address of the default gateway; reception of a physical address resolution response frame transmitted in response thereto; and storage of the MAC address of the default gateway in the storage apparatus 16.

Moreover, in this exemplary embodiment, any desired protocol, such as HTTP, HTTPS, or SNMP (Simple Network Management Protocol), may be used for transmission and reception of frames for the purposes of remotely setting the IP address of the tunneling apparatus 1, etc., and notifying errors, network traffic conditions and other information.

ICMP (Internet Control Message Protocol) frames can also be transmitted/received to notify the aliveness of the source.

The storage apparatus 16 also stores the physical and logical addresses of own apparatus, one or more logical addresses of apparatuses to which frames are to be tunneled, and the logical and physical addresses of the default gateway. When tag VLAN is used, the logical address of an apparatus to which a frame is to be tunneled may take a form of tag number.

Next, the types of Ethernet (registered trademark) frames received by the physical interface part 11 of the tunneling apparatus 1 will be defined in greater detail, followed by a description of the different transmission/reception sequences performed for different frame types.

Frames received by the tunneling apparatus 1 are roughly grouped into the following four types. The first type is frames to be transmitted to the kernel part 12 of the tunneling apparatus 1. The kernel part 12 processes all non-tunnel frames to be processed by the tunneling apparatus 1. These frames contain ARP 303, the IP address of the tunneling apparatus 1, the IP address of the tunneling apparatus 2 to which to connect to, HTTP to set via the Web the IP address of the default gateway, and other information.

The second type is tunnel frames received from the tunneling apparatus 2. The third is frames to be sent to the tunneling apparatus 2 after encapsulation. The fourth is frames to be discarded.

The description below assumes that the storage apparatus 16 stores the following settings: "MAC121" as the MAC address of own apparatus; "IP221" as own IP address; "IP222" as IP address of the apparatus to tunnel to; and "IP211" of the router 3-1 as the IP address of the default gateway.

Figure 6:
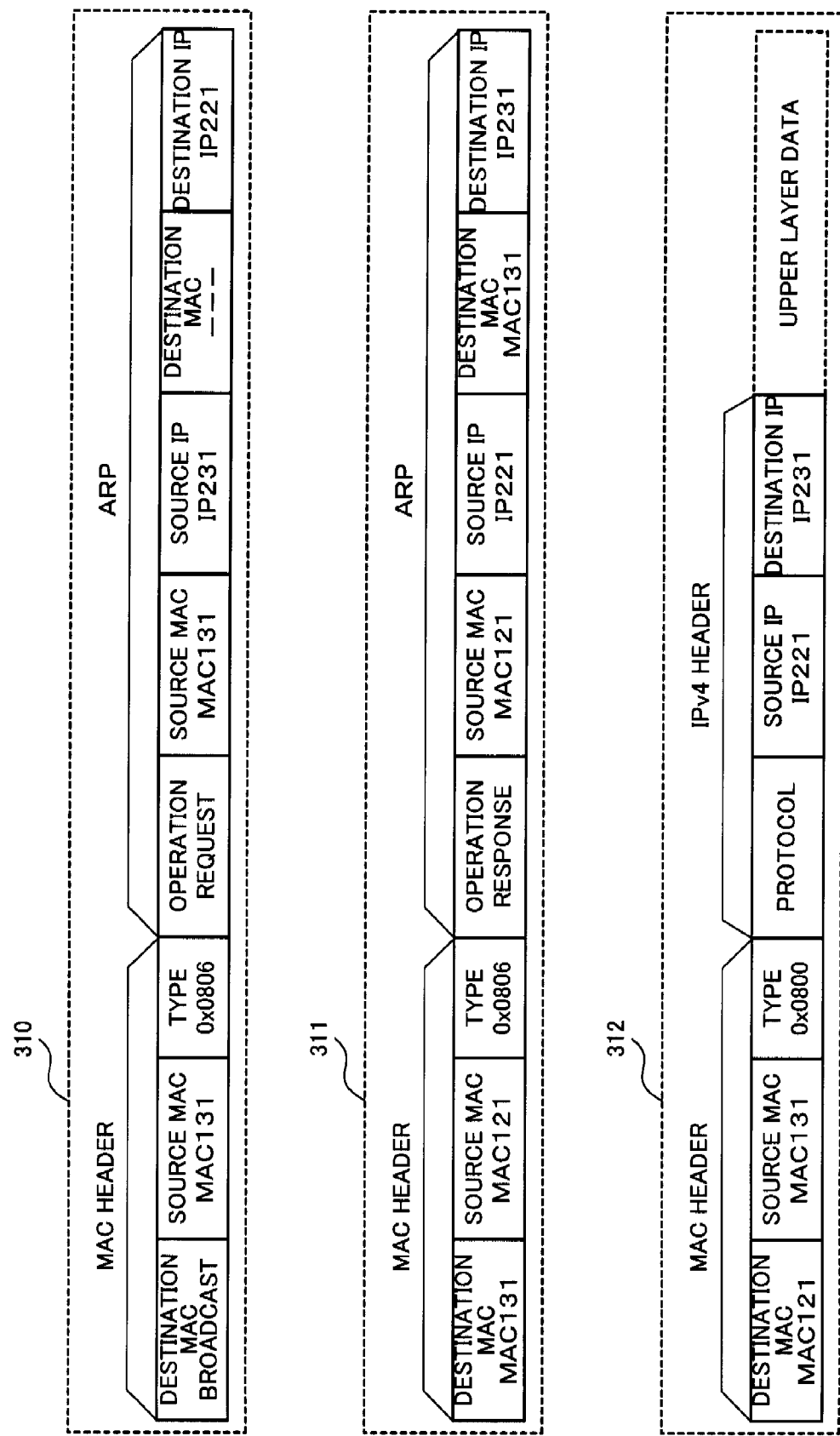
FIG. 6 is a diagram showing the format of a frame which is transmitted/received in the network configuration according to the first exemplary embodiment of the present invention.
Figure 7:
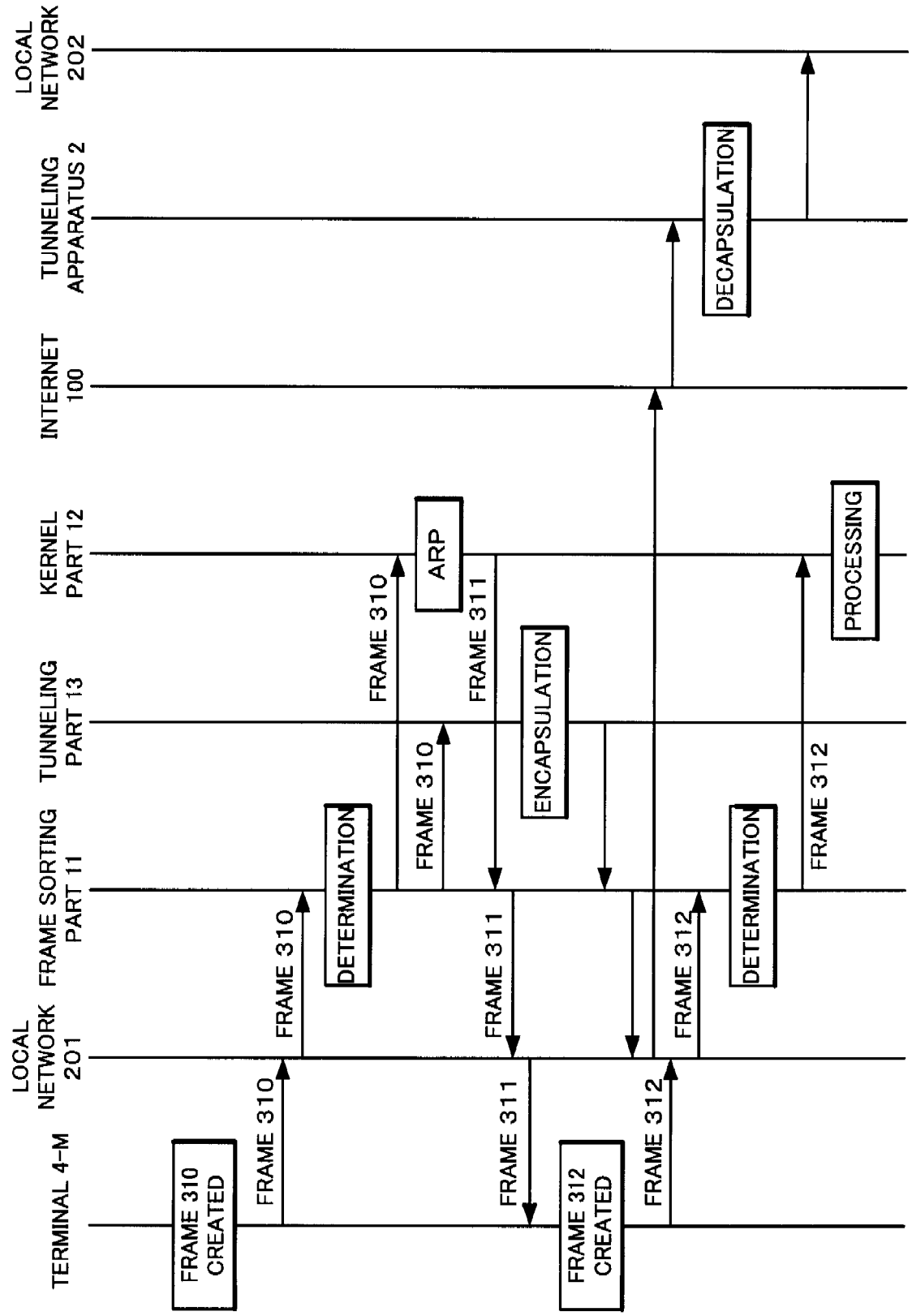
FIG. 7 is a sequence chart showing changes in the content of a frame and transmission and reception of a frame when EtherIP is used as an encapsulation means for the tunneling part in the network configuration according to the first exemplary embodiment of the present invention.

FIG. 6 is a diagram showing the format of a frame which is transmitted/received in the network configuration according to the first exemplary embodiment of the present invention. FIG. 7 is a sequence chart showing changes in the content of a frame and transmission and reception of a frame when EtherIP is used as an encapsulation means for the tunneling part 13 in the network configuration according to the first exemplary embodiment of the present invention. With reference to FIGS. 1 and 7, a frame to be transmitted to the kernel part will be described below.

The most important of all frames to be transmitted to the kernel part 12 is the physical address resolution request frame. This frame is an ARP request frame 310, wherein the "operation" field of the ARP 303 is set to "request" (refer to FIG. 6). The physical address resolution request frame is needed by an apparatus connected to the local network 201 or the local network 202 when it transmits data by specifying the IP address of the tunneling apparatus 1.

The description below, which explains an example of frames to be transmitted to the kernel part 12, assumes a case where an IP packet is transmitted from the terminal 4-M connected to the local network 201 to the tunneling apparatus 1. The description describes the operation during a sequence of following steps: the terminal 4-M transmits an ARP request frame 310 (a physical address resolution request frame) to the tunneling apparatus 1; in reply, the tunneling apparatus 1 transmits an ARP response frame 311 (a physical address resolution response frame) (refer to FIG. 6); by this, "MAC121" (the MAC address of the tunneling apparatus 1) is found; and the terminal 4-M transmits the IP packet using that MAC address.

The terminal 4-M needs to transmit an IP packet to the IP address of the tunneling apparatus 1 "IP221" but cannot create a frame because the MAC address of the tunneling apparatus 1 "MAC121" is unknown. The terminal 4-M, therefore, creates an ARP request frame 310 and attempts to acquire "MAC121."

The ARP request frame 310 consists of a MAC header 301 wherein the destination MAC address is a broadcast address, the source MAC address is the MAC address of the terminal 4-M "MAC131," the type is "0x0806," followed by an ARP 303 wherein the operation is "request," the source MAC address is "MAC131," the source IP address is "IP231," the destination MAC address contains no setting, and the destination IP address is "IP221."

The ARP request frame 310 is broadcast from the terminal 4-M to the local networks 201. The apparatuses other than the tunneling apparatus 1 ignore this frame because the destination IP address is not the IP address of own apparatus.

On receiving the ARP request frame 310 through the physical interface, the frame sorting part 11 of the tunneling apparatus 1 outputs the received frame to the kernel part 12 through the path #2 and to the tunneling part 13 through the path #3 (step S4 in FIG. 5), because the destination MAC address of the ARP request frame 310 is a broadcast address (broadcast address) (steps S1 and S3 in FIG. 5).

The ARP request frame 310 output to the tunneling part 13 is encapsulated with EtherIP and is transmitted through the path 4 to the frame sorting part 11, from which this frame is transmitted to the local network 201 through the path #1 (step S2 in FIG. 5). From the local network 201, the frame reaches the tunneling apparatus 2 via the router 3-1, the Internet 100, and the router 3-2. After decapsulation, the frame is transmitted to the local network 202. There is no apparatus with "IP231" in the local network 202, so no response occurs.

The ARP request frame 310 output to the kernel part 12 is first checked to determine whether or not it is an ARP frame and then whether or not it is an ARP request. Since the ARP request frame 310 contains an ARP 303 whose destination IP address matches the IP address "IP221" of own apparatus stored in the storage apparatus 16, the kernel part 12 creates an ARP response frame 311, which is a physical address resolution response frame.

The ARP response frame 311 consists of a MAC header 301 wherein the destination MAC address is the MAC address of the terminal 4-M "MAC131," the source MAC address is the MAC address of the tunneling apparatus 1 "MAC121," the type is "0x0806," followed by an ARP 303 wherein the operation is "response," the source MAC address is "MAC121," the source IP address is "IP221," the destination MAC address is "MAC131," and the destination IP address is "IP231."

The ARP response frame 311 is output from the kernel part 12 to the frame sorting part 11 through the path #2. The frame sorting part 11 transmits the ARP response frame 311 from the kernel part 12, which has been input through the path #2, to the local network 201 through the physical interface (path #1) (step S2 in FIG. 5). The terminal 4-M receives the ARP response frame 311 from the local network 201, and acquires the MAC address of the target tunneling apparatus 1 "MAC121."

Finally, the terminal 4-M transmits a frame 322 to the local network 201, the frame 322 containing a MAC header 301 wherein the destination MAC address is the MAC address of the tunneling apparatus 1 "MAC121," the source MAC address is the terminal 4-M's MAC address "MAC131," and the type is "0x0800," followed by an IPv4 header 302, which is an IP packet that the terminal 4-M originally needed to transmit, wherein the source IP address is "IP221" and the destination IP address is "IP231," and further followed by data of an upper layer.

The frame 322 is received by the frame sorting part 11 through the physical interface of the tunneling apparatus 1. The frame sorting part 11 outputs the frame 322 to the kernel part 12 through the path #2 (step S10 in FIG. 5), because the destination MAC address of the frame 322 is the MAC address of own apparatus (step S5 in FIG. 5), the frame 322 contains an IPv4 frame, but the source IP address is not the logical address of the specific apparatus (i.e., IP address of the tunneling apparatus 2 to connect to) (step S7 in FIG. 5). The kernel part 12 handles the frame 322 as a frame for other applications because the frame 322 does not contain an ARP frame.

In this way, the IP packet which the terminal 4-M originally needed to transmit can correctly reach the kernel part 12. Thereafter, the terminal 4-M can continue to transmit IP packets because it already stores the MAC address of the tunneling apparatus 1.

Figure 8:
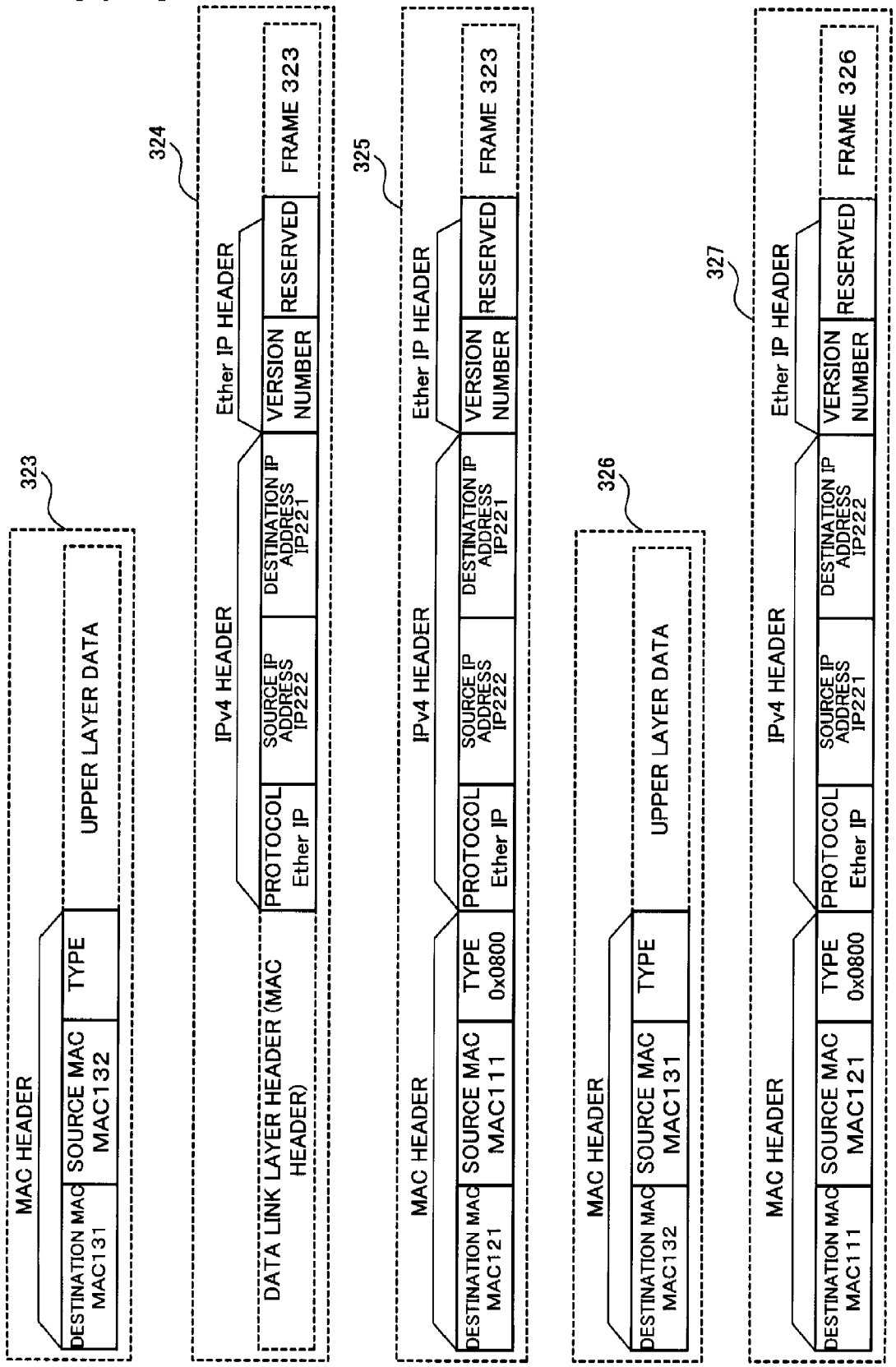
FIG. 8 is a diagram showing the format of a frame which is transmitted/received according to the first exemplary embodiment of the present invention.
Figure 9:
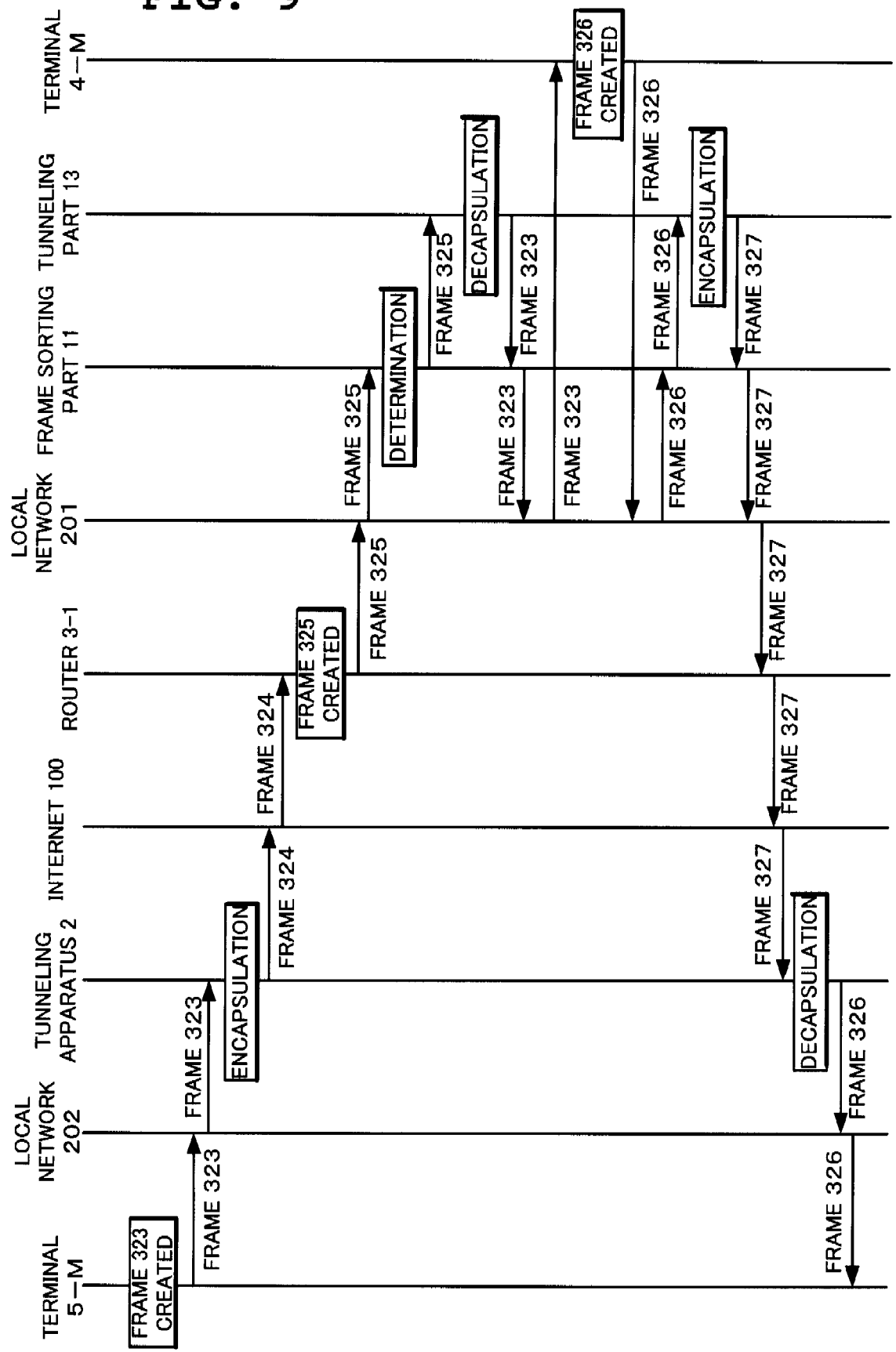
FIG. 9 is a sequence chart showing the process performed on frames which are transmitted/received within the network shown in FIG. 1.

Next, a frame to be decapsulated and a frame to be encapsulated will be described. FIG. 8 is a diagram showing the format of a frame which is transmitted/received according to the first exemplary embodiment of the present invention. FIG. 9 is a sequence chart showing the process performed on frames which are transmitted/received within the network shown in FIG. 1.

Frames to be decapsulated are those transmitted from the tunneling apparatus 2 for decapsulation by the tunneling apparatus 1. Frames to be encapsulated are those transmitted from the local network 201 for reception by the local network 202.

The description below describes the operation during a sequence of following steps: the terminal 5-N connected to the local network 202 transmits a frame to the terminal 4-M connected to the local network 201; the terminal 4-M transmits a response thereto to the terminal 5-N; and the terminal 5-N receives this response.

The description assumes that the terminal 4-M's MAC address "MAC131" is already known to the terminal 5-N. The terminal 5-N transmits to the local network 202 a frame 323 containing a MAC header 301 wherein the destination MAC address is "MAC131" and the source MAC address is "MAC132."

On receiving the frame 323, the tunneling apparatus 2 encapsulates the frame 323 with EtherIP, creates a new packet 324 by adding an IPv4 header 302 wherein the destination IP address is the tunneling apparatus 1's IP address "IP221" and the source IP address is the tunneling apparatus 2's IP address "IP222," and transmits the resultant packet to the Internet 100 through the router 3-2. While being transferred, the packet 324 is added various data link layer headers, including Ethernet (registered trademark), and ultimately reaches the router 3-1.

Since the destination IP address of the packet 324 is "IP221," the router 3-1 creates a new frame 325 by adding a MAC header 301 wherein the destination MAC address is the corresponding MAC address "MAC121" and the source MAC address is own apparatus' MAC address "MAC111," and transmits the resultant frame 325 to the local network 201. If "MAC121" were yet to be known, the router 3-1 would have attempted to acquire "MAC121" by transmitting an ARP request frame and created the frame 325 on successfully acquiring "MAC121."

The frame 325 sent out to the local network 201 is received by the frame sorting part 11 through the physical interface of the tunneling apparatus 1 (path #1). The content of the frame 325 is as follows: the destination MAC address is the MAC address of the tunneling apparatus 1 "MAC121," which has been set by the router 3-1 (step S5 of FIG. 5); the frame 325 is an IPv4 frame; the source IP address is the IP address, which has been set by the tunneling apparatus 2 "IP222" (step S7 in FIG. 5); and the protocol of the IPv4 header 302 has been specified as "0x61" (step S8 of FIG. 5).

Based on this content, the frame sorting part 11 determines that the frame 325 is a tunnel frame and outputs it to the tunneling part 13 through the path #4 (step S9 in FIG. 5). The tunneling part 13 takes out the encapsulated frame 323 within the frame 325 and outputs the resultant frame 323 to the frame sorting part 11 through the path #3.

The frame sorting part 11 transmits the frame 323, which has been input through the path #3, to the local network 201 through the physical interface (path #1) (steps S1 and S2 in FIG. 5). The terminal 4-M receives the frame 323 from the local network 201. In this way, the frame 323 transmitted from the terminal 5-N can correctly be received by the terminal 4-M.

The terminal 4-M transmits to the local network 201 a frame 326, which contains a MAC header 301 wherein the destination MAC address is the MAC address of the terminal 5-N "MAC132" and the source MAC address is "MAC131." The frame sorting part 11 of the tunneling apparatus 1 receives the frame 326 from the local network 201 through the physical interface (path #1), and outputs the frame 326 to the tunneling part 13 through the path #3 (step S11 in FIG. 5) because the destination MAC address of the frame 326 is not the MAC address of own apparatus (step S5 in FIG. 5).

The tunneling part 13 creates a packet 327 by encapsulating the frame 326 thereinto using EtherIP. The packet 327 is sent to the frame sorting part 11 through the path #4, and is transmitted to the local network 201 through the physical interface (path #1) (step S2 in FIG. 5). Thereafter, the packet 327 reaches the tunneling apparatus 2, via the router 3-1, the Internet 100, and the router 3-2. The tunneling apparatus 2 decapsulates the received packet 327 and transmits the original frame 326 to the local network 202 and is received by the terminal 5-N. In this way, the frame 326 transmitted from the terminal 4-M can correctly be received by the terminal 5-N.

Since, as described above, this exemplary embodiment can properly sort and process frames received from the same physical interface into frames to be processed by own apparatus, frames to be transmitted after encapsulation, frames to be transmitted after decapsulation, etc., the exemplary embodiment enables one to perform the tunneling process properly simply by connecting one physical interface of the tunneling apparatus 1 to the local network 201, without requiring the network to be suspended or requiring the existing configuration of the local networks 201 and 202 to be changed.

Figure 10:
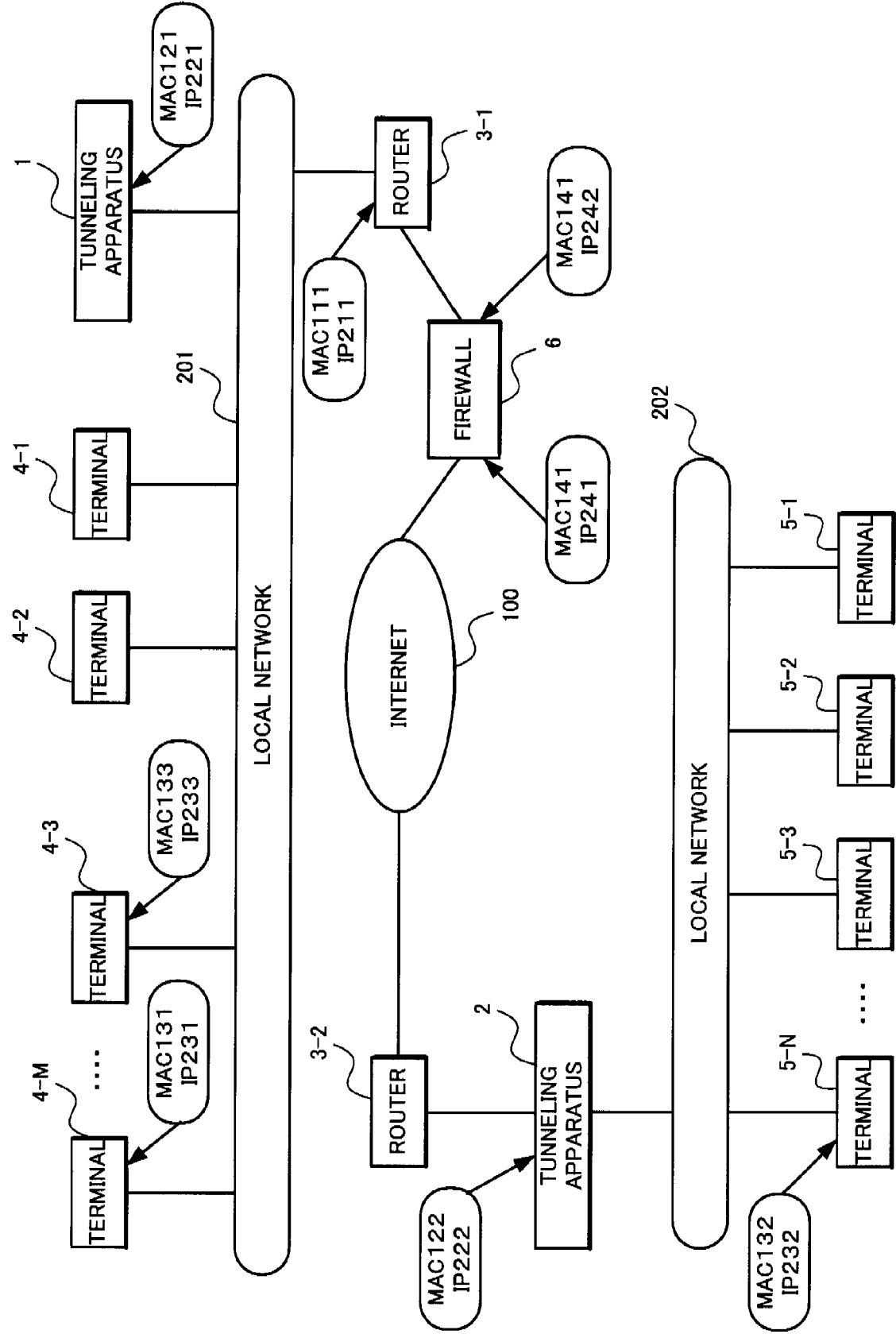
FIG. 10 is a block diagram showing a variation example of the network according to the first exemplary embodiment of the present invention.

FIG. 10 is a block diagram showing a variation example of the network according to the first exemplary embodiment of the present invention. The example network shown in FIG. 10 has the same configuration as the network according to the exemplary embodiment of the present invention shown in FIG. 1, except in that a firewall 6 is provided between the Internet 100 and the router 3-1. In this case, the IP address "IP241" of the firewall 6 is the destination logical address of a frame to be transmitted from the tunneling apparatus 2 to the tunneling apparatus 1. The firewall 6 replaces this destination logical address with "IP221" and transmits the resultant frame the tunneling apparatus 1. The firewall may sometimes replace the source logical address with "IP242." In this case, the tunneling apparatus 1 stores "IP242" as the logical address of the specific apparatus. The firewall may be an address conversion apparatus. The steps in the operation other than those described above will be omitted from the description because they are the same as the operation of the above-described first exemplary embodiment of the present invention.

Second Exemplary Embodiment

The second exemplary embodiment of the present invention will now be described. A network according to the second exemplary embodiment of the present invention has the same configuration as the network according to the above-described first exemplary embodiment of the present invention, and a tunneling apparatus comprising the network has the same functions and configuration as the tunneling apparatus according to the above-described first exemplary embodiment of the present invention. Therefore, these will be omitted from the description.

FIGS. 11 to 14 are flow charts showing the frame sorting process performed by the frame sorting part according to the second exemplary embodiment of the present invention. The operation of the tunneling apparatus 1 according to the second exemplary embodiment of the present invention will now be described by referring to FIGS. 1 to 3 and FIGS. 11 to 14. The processes shown in FIGS. 11 to 14 are achieved when the control program 15a is executed by the above-described CPU 14.

Figure 11:
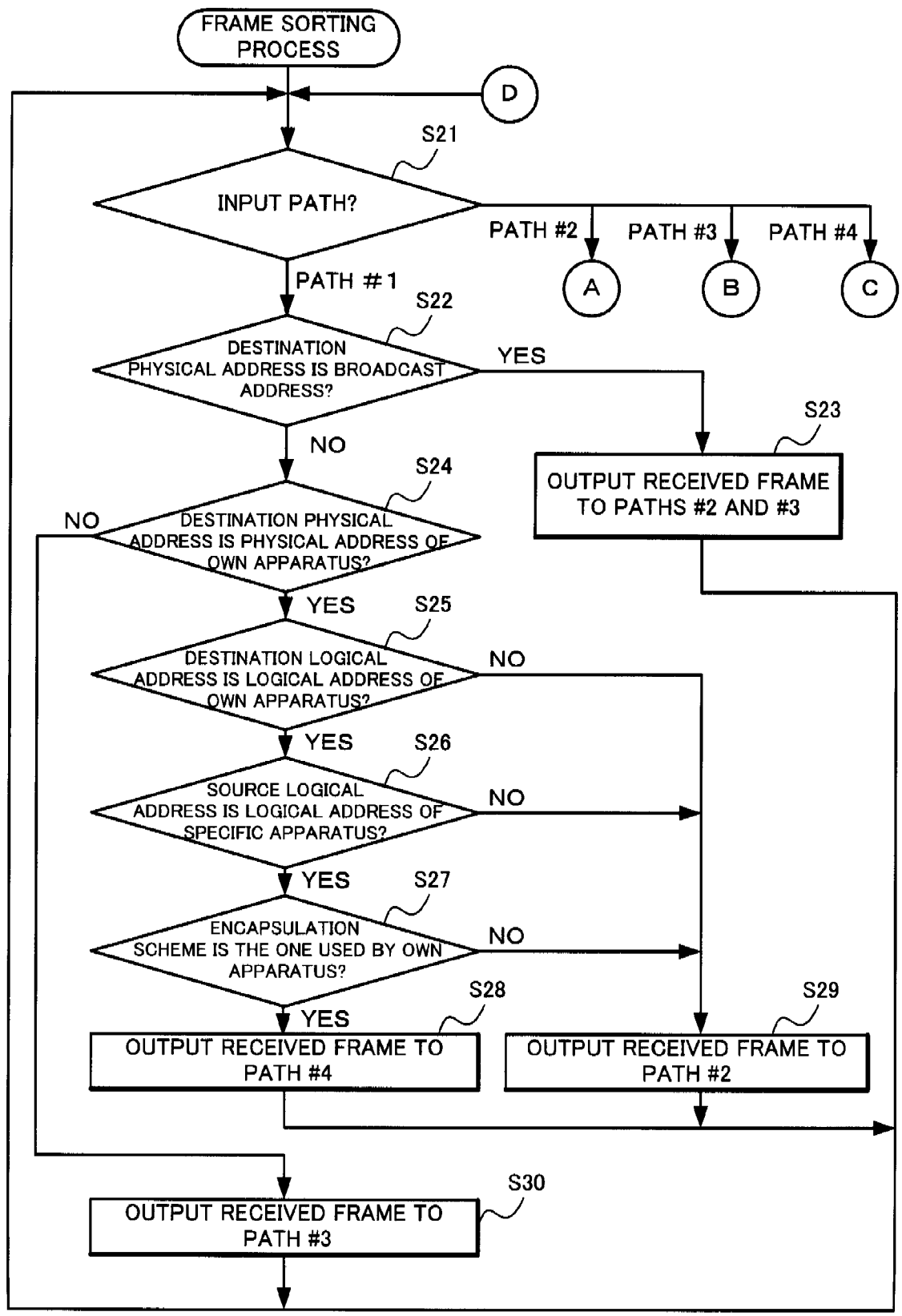
FIG. 11 is a flow chart showing the frame sorting process performed by a frame sorting part according to a second exemplary embodiment of the present invention.

In the second exemplary embodiment of the present invention, the frame sorting part 11 behaves in such a manner that it permits communication from the destination of tunneling to the kernel part 12. The operation during steps S22 to S30 shown in FIG. 11 is the same as that during steps S3 to S11 shown in FIG. 5, because the frame sorting part 11 performs the same operation on frames input through the path #1 as the above-described first exemplary embodiment of the present invention. Therefore, the process performed on frames input through the path #1 will also be omitted from the description.

Figure 12:
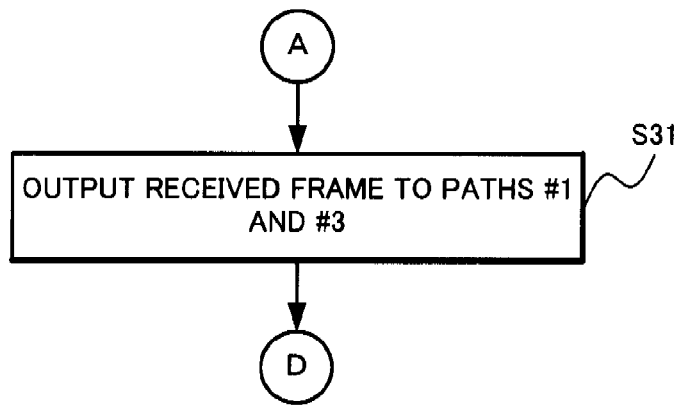
FIG. 12 is a flow chart showing the frame sorting process performed by the frame sorting part according to the second exemplary embodiment of the present invention.
Figure 13:
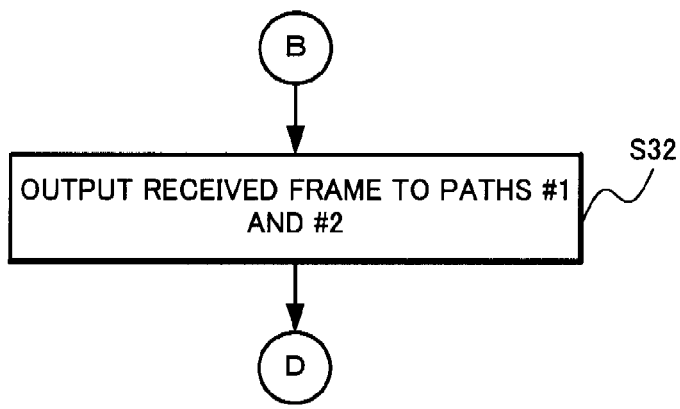
FIG. 13 is a flow chart showing the frame sorting process performed by the frame sorting part according to the second exemplary embodiment of the present invention.
Figure 14:
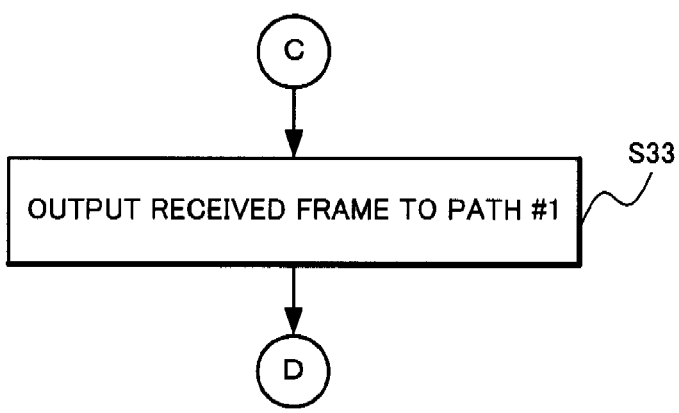
FIG. 14 is a flow chart showing the frame sorting process performed by the frame sorting part according to the second exemplary embodiment of the present invention.

Since the frame sorting part 11 behaves in such a manner that it permits communication from the destination of tunneling to the kernel part 12, the frame sorting part 11 outputs frames input through the path #2 to the local network 201 through the path #1 and outputs these frames also to the tunneling part 13 through the path #3 (step S21 in FIG. 11 and step S31 in FIG. 12). Similarly, the frame sorting part 11 outputs frames input through the path #3 to the local network 201 through the path #1 and outputs these frames also to the kernel part 12 through the path #2 (step S21 in FIG. 11 and step S32 in FIG. 13).

Frames input through the path #4 are output to the local network 201 through the path #1 (step S21 in FIG. 11 and step S33 in FIG. 13), similarly to the above-described first exemplary embodiment of the present invention. Thus, in addition to the effects provided by the above-described first exemplary embodiment of the present invention, the second exemplary embodiment can cause the frame sorting part 11 to operate such that communication from the destination of tunneling to the kernel part 12 is permitted.

Furthermore, the tunneling apparatus 1 of this exemplary embodiment may have a DHCP (Dynamic Host Configuration Protocol) server in the kernel part 12 and use the server to perform the distribution of IP addresses and some other tasks. This makes it possible for the tunneling apparatus 1 having an IP address to communicate with any of the terminals 4-1 to 4-M and 5-1 to 5-N in the local networks 201, 202, using that IP address. Through such communication, the tunneling apparatus 1 can, for example, make various settings and inquire various information remotely and distribute its IP address.

Third Exemplary Embodiment

The third exemplary embodiment of the present invention will be described below. A network according to the third exemplary embodiment of the present invention has the same configuration as the network according to the above-described second exemplary embodiment of the present invention, and a tunneling apparatus comprising the network has the same functions and configuration as the tunneling apparatus according to the above-described second exemplary embodiment of the present invention. Therefore, these will be omitted from the description.

FIGS. 15 to 18 are flow charts showing the frame sorting process performed by the frame sorting part according to the third exemplary embodiment of the present invention. The operation of the tunneling apparatus 1 according to the third exemplary embodiment of the present invention will now be described by referring to FIGS. 1 to 3 and FIGS. 15 to 18. The processes shown in FIGS. 15 to 18 are achieved when the control program 15a is executed by the above-described CPU 14.

Figure 15:
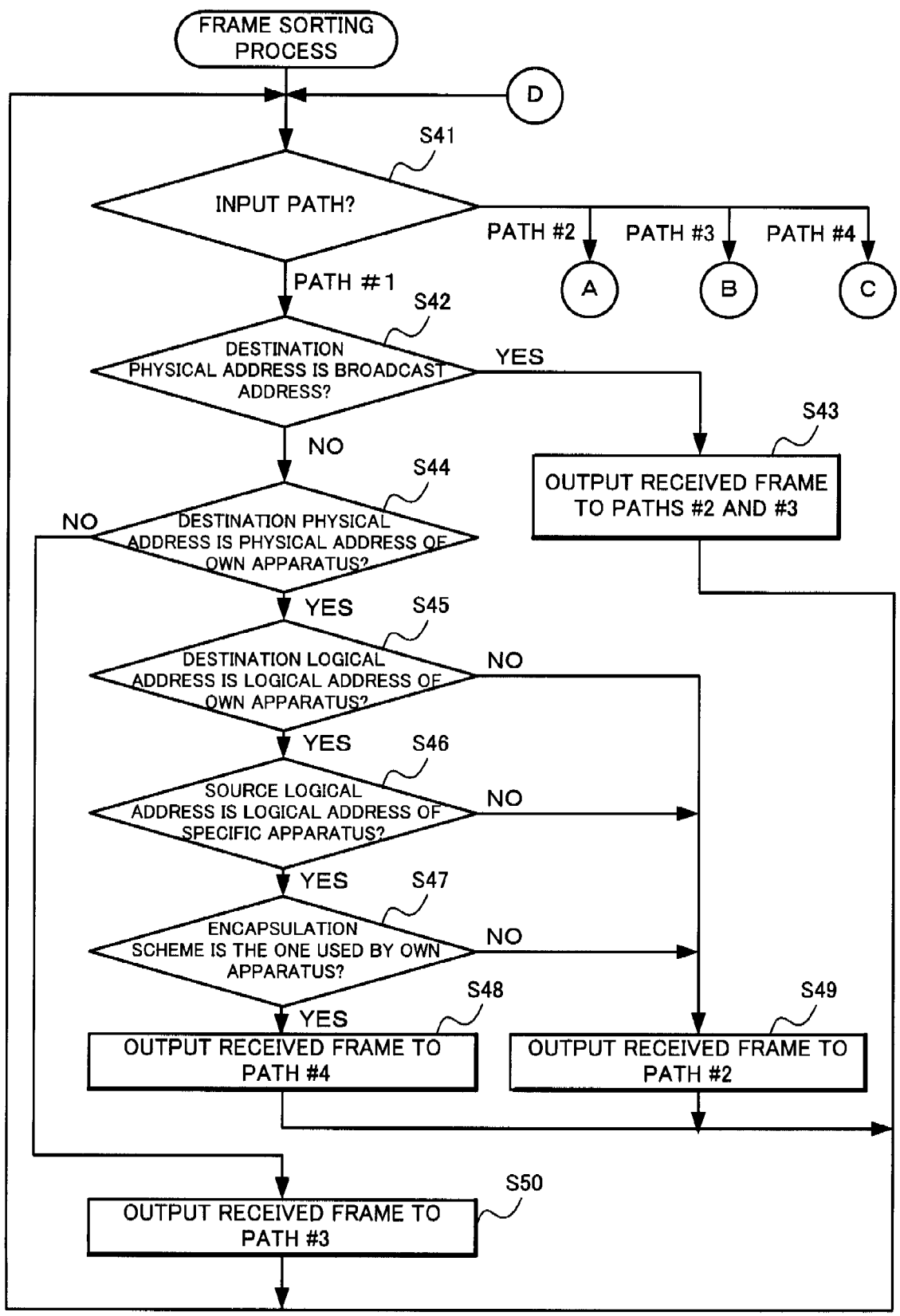
FIG. 15 is a flow chart showing the frame sorting process performed by a frame sorting part according to a third exemplary embodiment of the present invention.

In the third exemplary embodiment of the present invention, the frame sorting part 11 operates in such a manner to prevent unnecessary processes in the operation of the tunneling apparatus 1 in the above-described second exemplary embodiment of the present invention from being performed. However, the operation during steps S42 to S50 shown in FIG. 15 is the same as that during steps S22 to S30 shown in FIG. 11, because the frame sorting part 11 performs the same operation on frames input through the path #1 as the above-described second exemplary embodiment of the present invention. Therefore, the process performed on frames input through the path #1 will also be omitted from the description.

Figure 16:
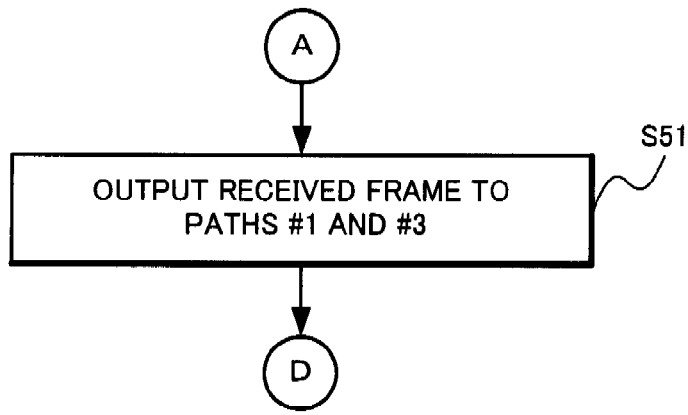
FIG. 16 is a flow chart showing the frame sorting process performed by the frame sorting part according to the third exemplary embodiment of the present invention.

The frame sorting part 11 outputs frames input through the path #2 to the local network 201 through the path #1 and outputs these frames also to the tunneling part 13 through the path #3 (step S41 in FIG. 15 and step S51 in FIG. 16). Similarly, the frame sorting part 11 outputs frames input through the path #4 to the local network 201 through the path #1 (step S41 in FIG. 15 and step S57 in FIG. 18).

When a frame is input through the path #3 (step S41 in FIG. 15), and if the destination physical address of the frame is a broadcast address (step S52 in FIG. 17), the frame sorting part 11 outputs the frame to the local network 201 through the path #1 and to the kernel part 12 through the path #2 (step S53 in FIG. 17), because the frame is either a broadcast or multi-cast frame.

Figure 17:
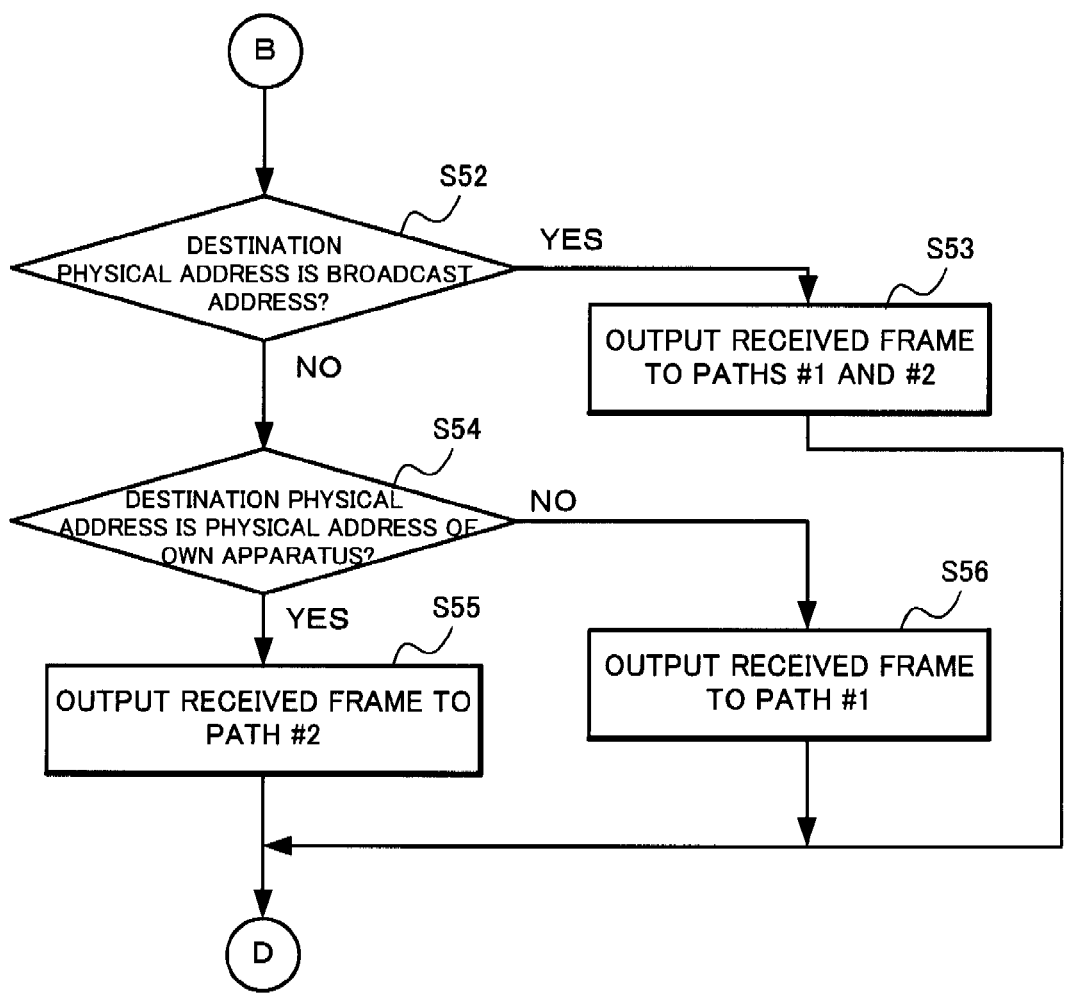
FIG. 17 is a flow chart showing the frame sorting process performed by the frame sorting part according to the third exemplary embodiment of the present invention.
Figure 18:
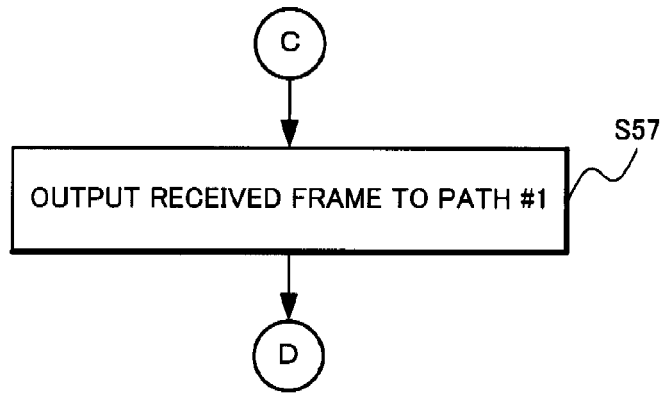
FIG. 18 is a flow chart showing the frame sorting process performed by the frame sorting part according to the third exemplary embodiment of the present invention.

If the destination physical address of the frame is the physical address of own apparatus (step S54 in FIG. 17), the frame sorting part 11 outputs the frame to the kernel part 12 through the path #2 (step S55 in FIG. 17). If the destination physical address of the frame is neither a broadcast address nor the physical address of own apparatus (step S54 in FIG. 17), then the frame sorting part 11 outputs the frame to the local network 201 through the path #1 (step S56 in FIG. 17).

Thus, in addition to the effects provided by the above-described second exemplary embodiment of the present invention, the third exemplary embodiment can cause the tunneling apparatus 1 to operate such that unnecessary frames can be prevented from being transferred.

Fourth Exemplary Embodiment

The fourth exemplary embodiment of the present invention will be described below. A network according to the fourth exemplary embodiment of the present invention has the same configuration as the network according to the above-described third exemplary embodiment of the present invention, and a tunneling apparatus comprising the network has the same configuration as the tunneling apparatus according to the above-described third exemplary embodiment of the present invention. Therefore, these will be omitted from the description.

Figure 19:
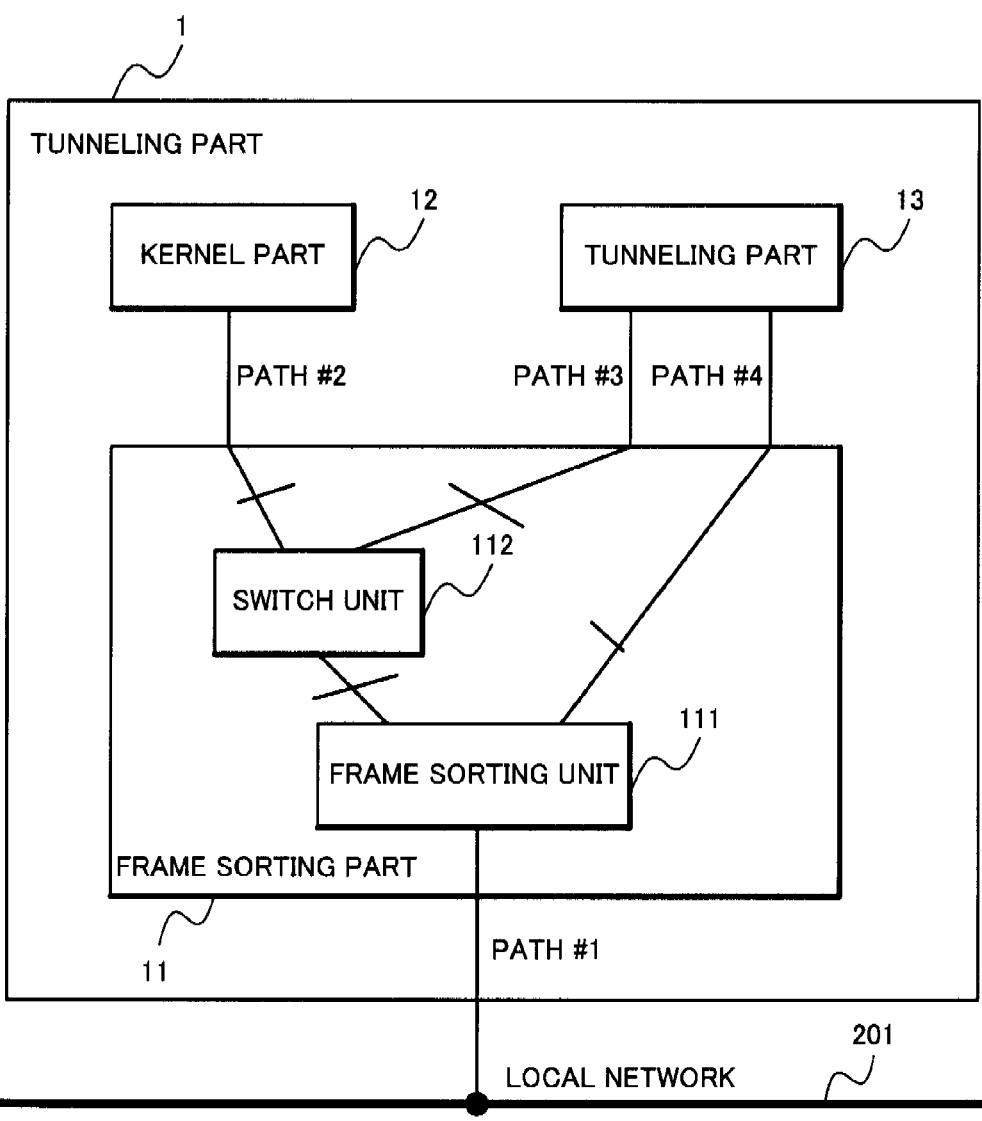
FIG. 19 is a block diagram showing the functional configuration of a tunneling apparatus according to a fourth exemplary embodiment of the present invention.

FIG. 19 is a block diagram showing the functional configuration of the tunneling apparatus 1 according to the fourth exemplary embodiment of the present invention. As shown in FIG. 19, the tunneling apparatus 1 comprises a frame sorting part 11, a kernel part 12, and a tunneling part 13. The frame sorting part 11 further comprises a frame sorting unit 111 and a switch unit 112.

The frame sorting unit 111 allocates frames input through the path #1 between the switch unit 112 and the path #4, frames input through the path #4 between the switch unit 112 and the path #1, and frames input through the switch unit 112 between the path #1 and the path #4. The switch unit 112 switches the path for frames input from the frame sorting unit 111 to the paths #2 and #3, the path for frames input through the path #2 to the frame sorting unit 111 and the path #3, the path for frames input through the path #3 to the frame sorting unit 111 and the path #2, and outputs these frames thereto, respectively.

FIGS. 20 to 23 are flow charts showing the frame sorting process performed by the frame sorting part according to the fourth exemplary embodiment of the present invention. The operation of the tunneling apparatus 1 according to the fourth exemplary embodiment of the present invention will now be described by referring to FIGS. 1 and 3 and FIGS. 19 to 23. The processes shown in FIGS. 20 to 23 are achieved when the control program 15a is executed by the above-described CPU 14.

Figure 20:
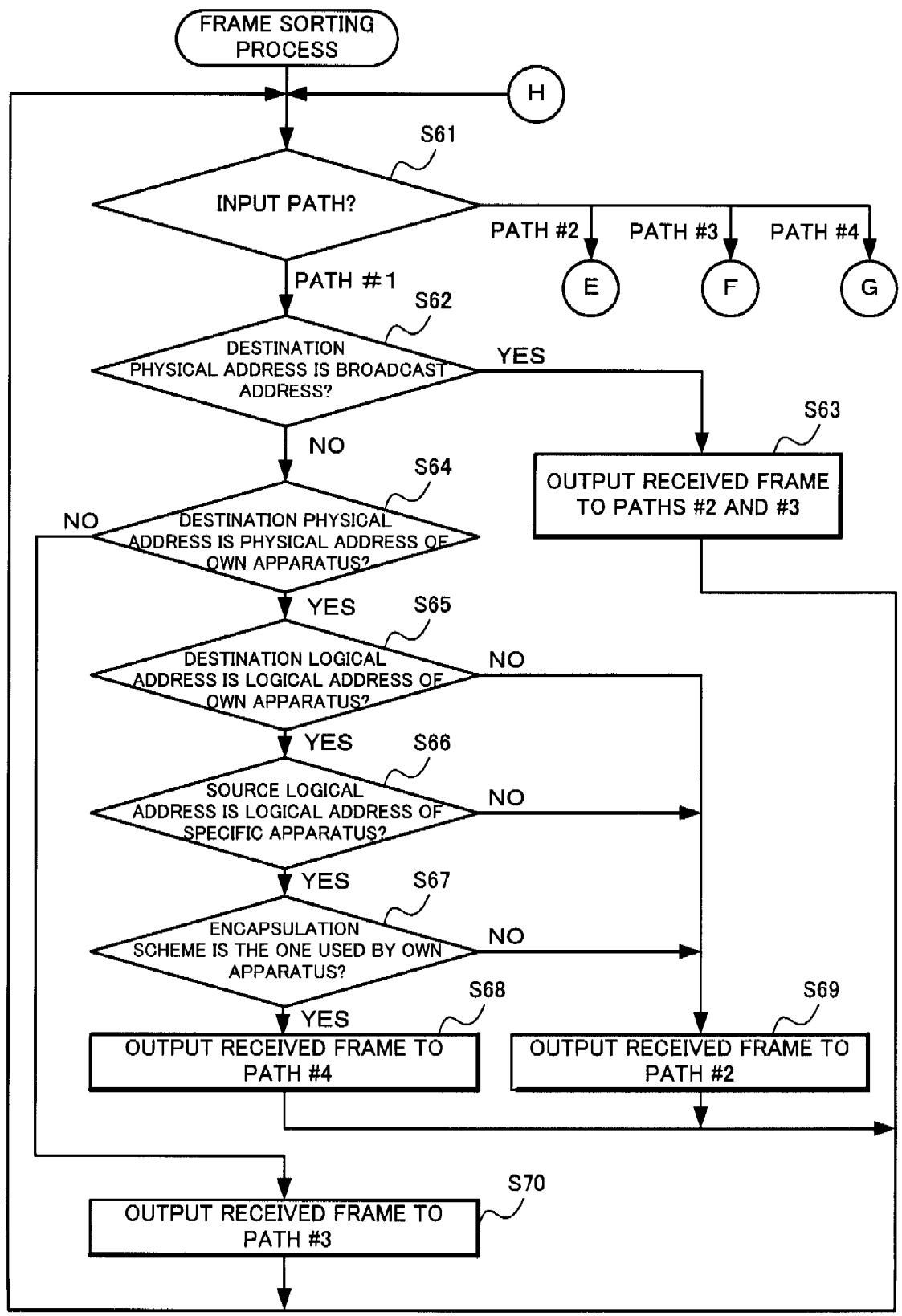
FIG. 20 is a flow chart showing the frame sorting process performed by the frame sorting part according to the fourth exemplary embodiment of the present invention.

In the fourth exemplary embodiment of the present invention, the frame sorting part 11 operates in such a manner to further prevent unnecessary frames from being transferred in the operation of the tunneling apparatus 1 in the above-described third exemplary embodiment of the present invention. The operation during steps S62 to S70 shown in FIG. 20 is the same as that during steps S42 to S50 shown in FIG. 15, because the frame sorting part 11 performs the same operation on frames input through the path #1 as the above-described second exemplary embodiment of the present invention. Therefore, the process performed on frames input through the path #1 will also be omitted from the description.

Figure 21:
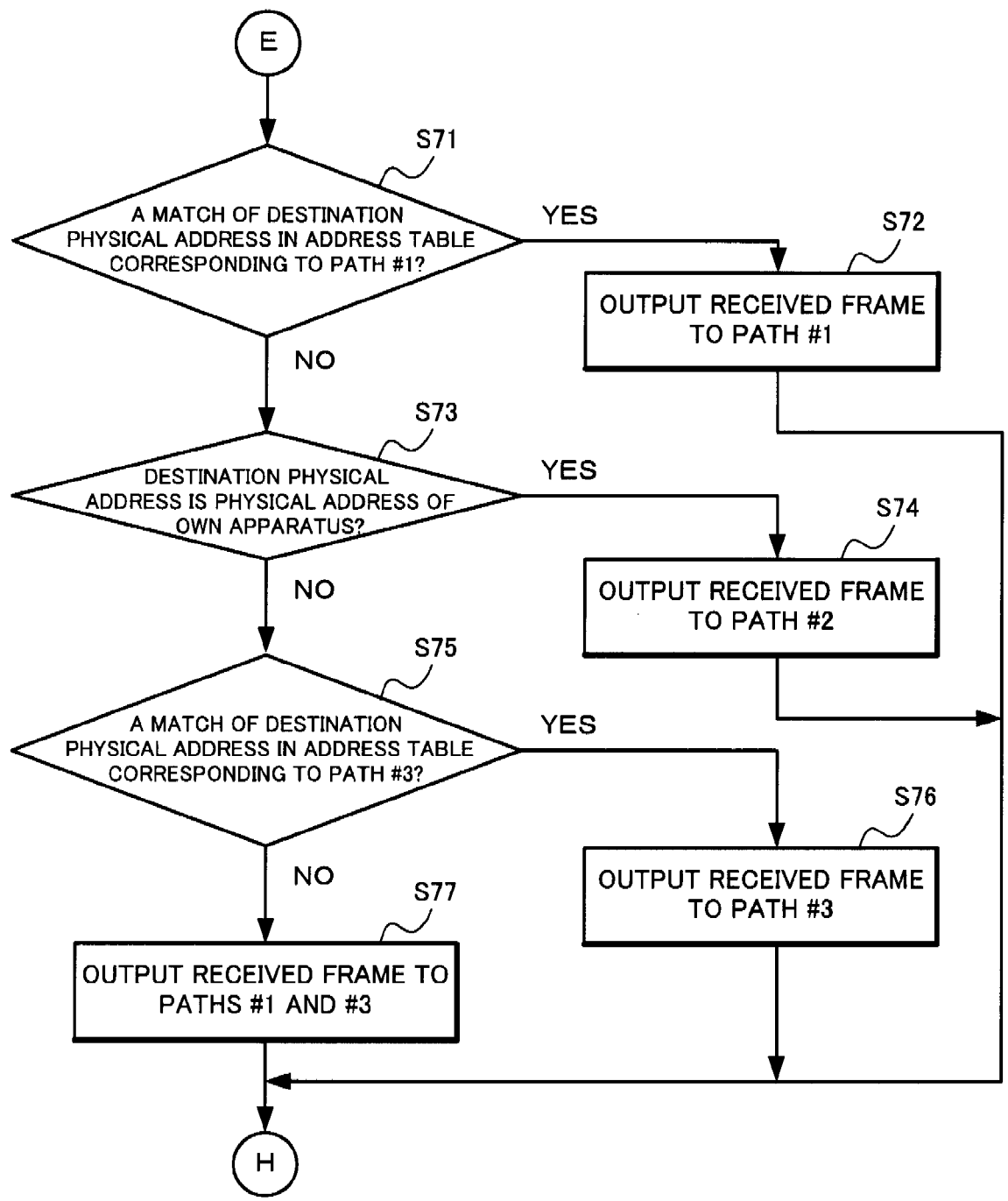
FIG. 21 is a flow chart showing the frame sorting process performed by the frame sorting part according to the fourth exemplary embodiment of the present invention.

When a frame is input into the switch unit 112 through the path #2 (step S61 in FIG. 20), and if the destination physical address of the frame matches any of the addresses stored in the path #1 address table 161 (step S71 in FIG. 21), the frame sorting part 11 outputs the frame from the switch unit 112 to the local network 201 through the frame sorting unit 111 and the path #1 (step S72 in FIG. 21).

If the destination physical address of the frame is the physical address of own apparatus (step S73 in FIG. 21), the frame sorting part 11 outputs the frame from the switch unit 112 to the kernel part 12 through the path #2 (step S74 in FIG. 21).

If the destination physical address of the frame matches any of the addresses stored in the path #3 address table 163 (step S75 in FIG. 21), the frame sorting part 11 outputs the frame from the switch unit 112 to the tunneling part 13 through the path #3 (step S76 in FIG. 21).

If the destination physical address of the frame does not match any of the addresses stored in the path (#1 to #3) address tables 161 to 163, the frame sorting part 11 outputs the frame from the switch unit 112 to the local network 201 through the frame sorting unit 111 and the path #1 as well as to the tunneling part 13 from the switch unit 112 through the path #3 (step S77 in FIG. 21).

When a frame is input through the path #3 (step S61 in FIG. 20), and if the destination physical address of the input frame is a broadcast address (step S78 in FIG. 22), the frame sorting part 11 outputs the frame from the switch unit 112 to the local network 201 through the frame sorting unit 111 and the path #1 as well as to the kernel part 12 from the switch unit 112 through the path #2 (step S79 in FIG. 22), because the frame is either a broadcast or multi-cast frame.

Figure 22:
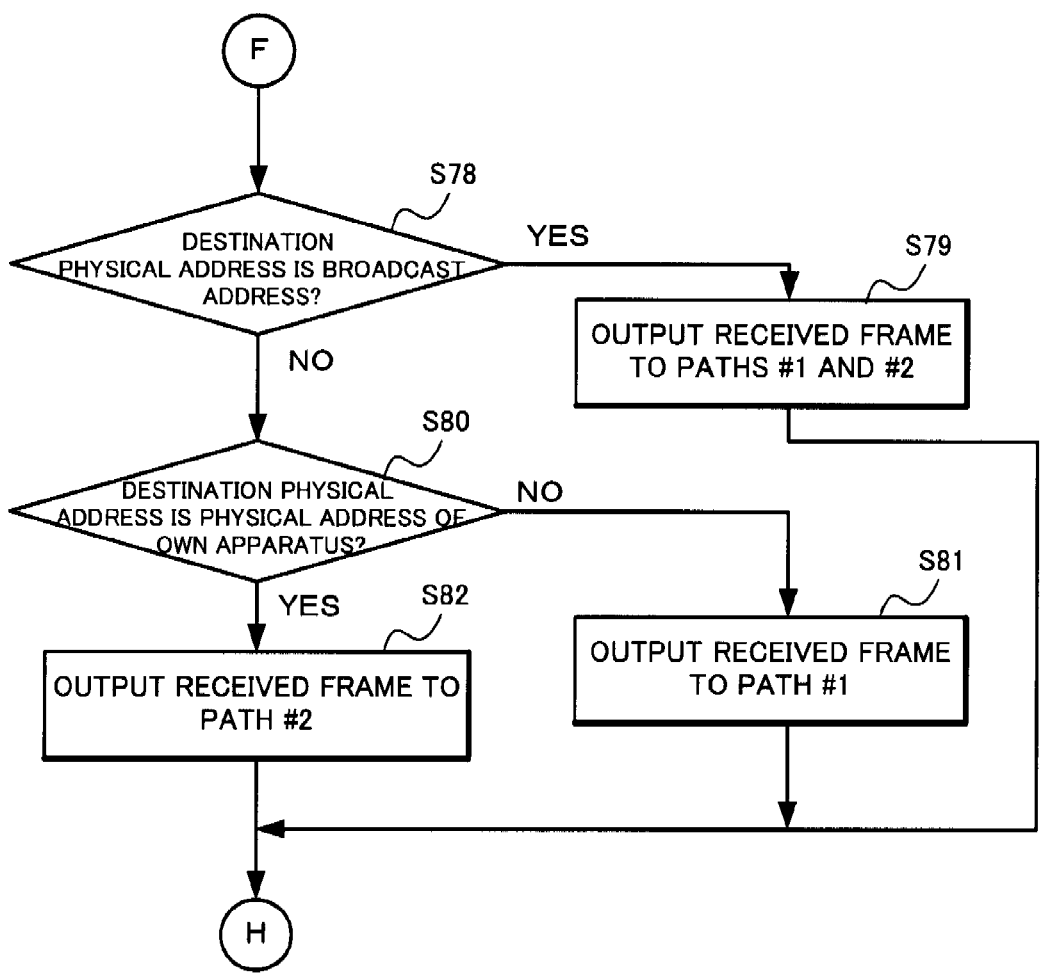
FIG. 22 is a flow chart showing the frame sorting process performed by the frame sorting part according to the fourth exemplary embodiment of the present invention.

If the destination physical address of the frame is the physical address of own apparatus (step S80 in FIG. 22), the frame sorting part 11 outputs the frame from the switch unit 112 to the local network 201 through the frame sorting unit 111 and the path #11 (step S81 in FIG. 22). If the destination physical address of the frame is neither a broadcast address nor the physical address of own apparatus (step S80 in FIG. 22), the frame sorting part 11 outputs the frame from the switch unit 112 to the kernel part 12 through the path #2 (step S82 in FIG. 22).

Figure 23:
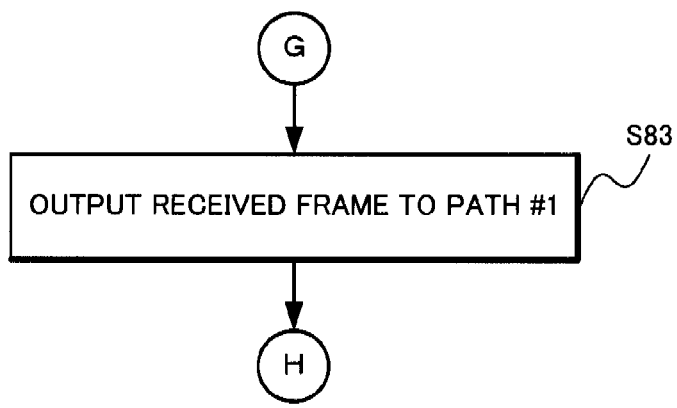
FIG. 23 is a flow chart showing the frame sorting process performed by the frame sorting part according to the fourth exemplary embodiment of the present invention.
Figure 24:
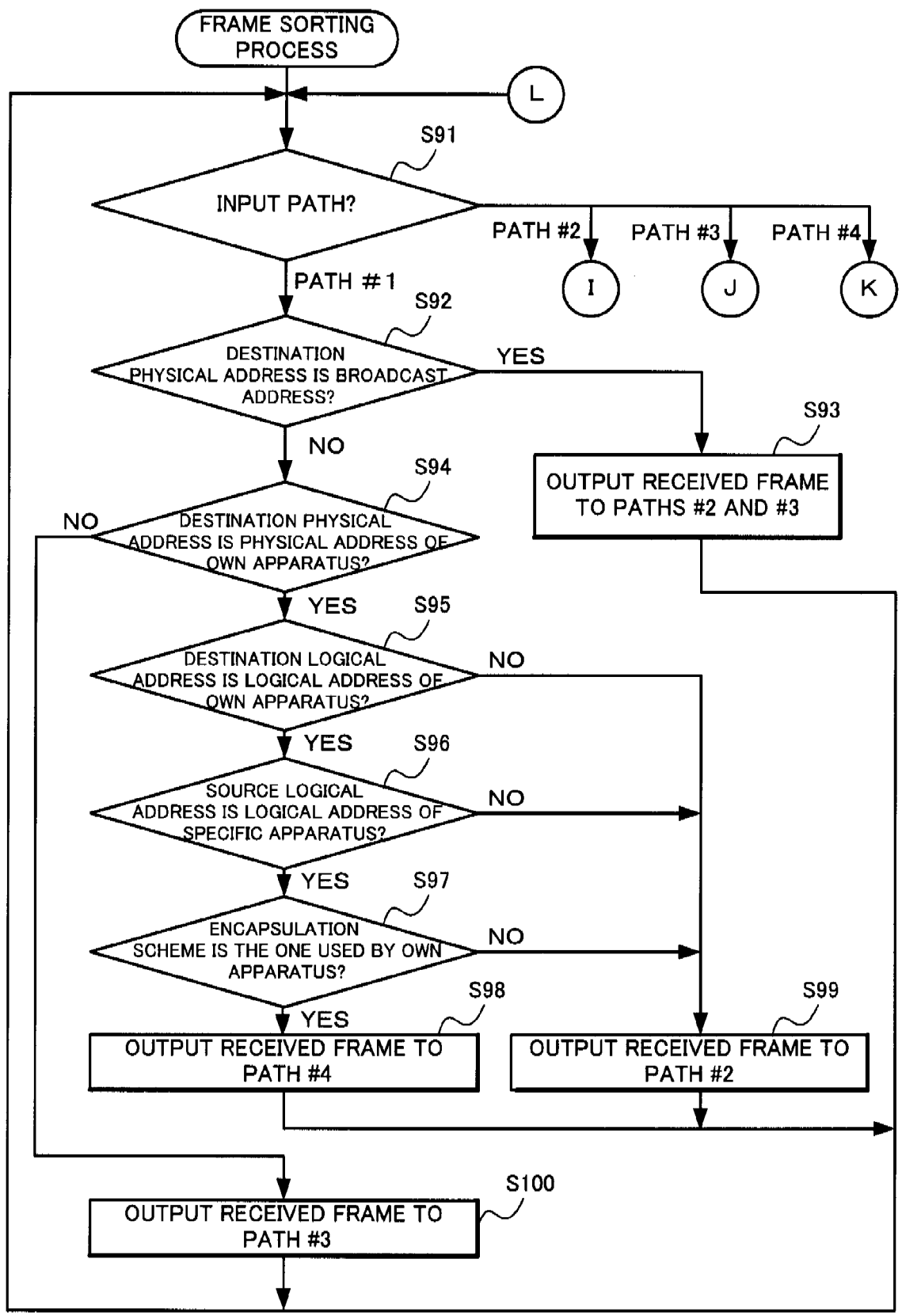
FIG. 24 is a flow chart showing the frame sorting process performed by a frame sorting part according to a fifth exemplary embodiment of the present invention.
Figure 25:
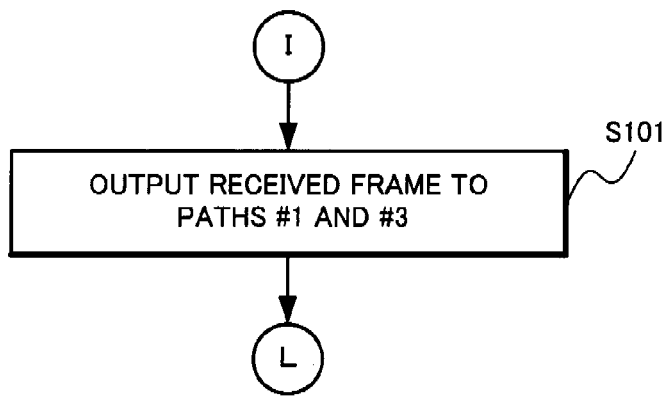
FIG. 25 is a flow chart showing the frame sorting process performed by the frame sorting part according to the fifth exemplary embodiment of the present invention.

When a frame is input through the path #4 (step S61 in FIG. 20), the frame sorting part 11 outputs the input frame to the local network 201 from the sorting unit 111 through the path #1 (step S83 in FIG. 23).

Thus, in addition to the effects provided by the above-described third exemplary embodiment of the present invention, the fourth exemplary embodiment can cause the tunneling apparatus 1 to operate such that unnecessary frames will further be prevented from being transferred.

Fifth Exemplary Embodiment

The fifth exemplary embodiment of the present invention will be described below. A network according to the fifth exemplary embodiment of the present invention has the same configuration as the network according to the above-described third exemplary embodiment of the present invention, and a tunneling apparatus comprising the network has the same functions and configuration as the tunneling apparatus according to the above-described third exemplary embodiment of the present invention. Therefore, these will be omitted from the description.

FIGS. 24 to 27 are flow charts showing the frame sorting process performed by the frame sorting part according to the fifth exemplary embodiment of the present invention. The operation of the tunneling apparatus 1 according to the fifth exemplary embodiment of the present invention will now be described by referring to FIGS. 1 to 3 and FIGS. 24 to 27. The processes shown in FIGS. 24 to 27 are achieved when the control program 15a is executed by the above-described CPU 14.

Figure 27:
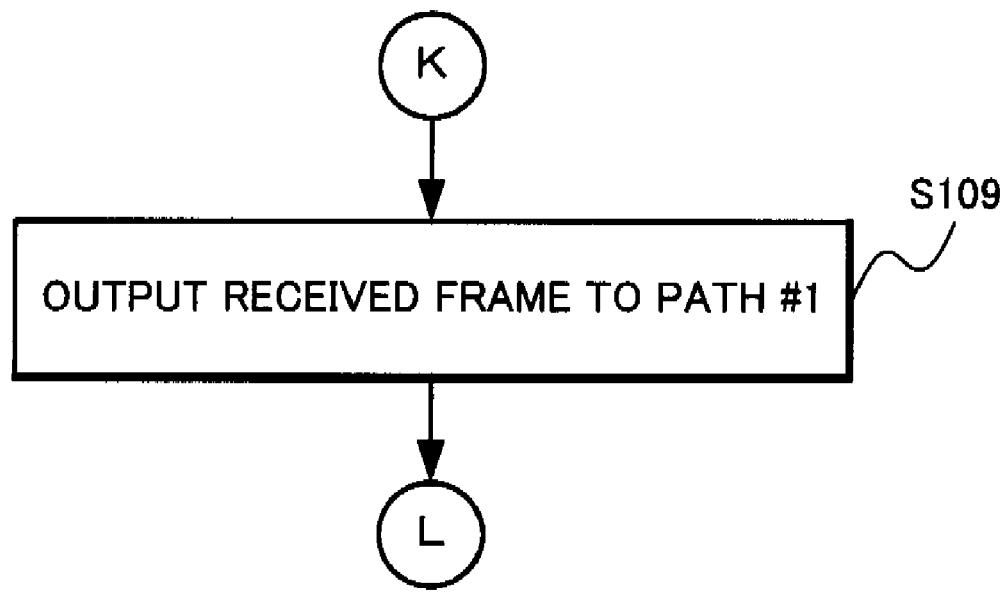
FIG. 27 is a flow chart showing the frame sorting process performed by the frame sorting part according to the fifth exemplary embodiment of the present invention.

In the fifth exemplary embodiment of the present invention, the frame sorting part 11 operates in such a manner to cause the tunneling apparatus 1 according to the above-described third exemplary embodiment of the present invention to discard frames to be discarded during the operation thereof. However, since the frame sorting part 11 operates on frames input through the paths #1, #2, and #4 in similar manners to the above-described third exemplary embodiment of the present invention, its operation during steps S92 to S100 in FIG. 24, step S101 in FIG. 25, and step S109 in FIG. 27 are the same as steps S42 to S50 in FIG. 15, step S51 in FIG. 16, and step S57 in FIG. 18, respectively. Therefore, the processes performed on frames input through the paths #1, #2, and #4 will be omitted from the description.

Figure 26:
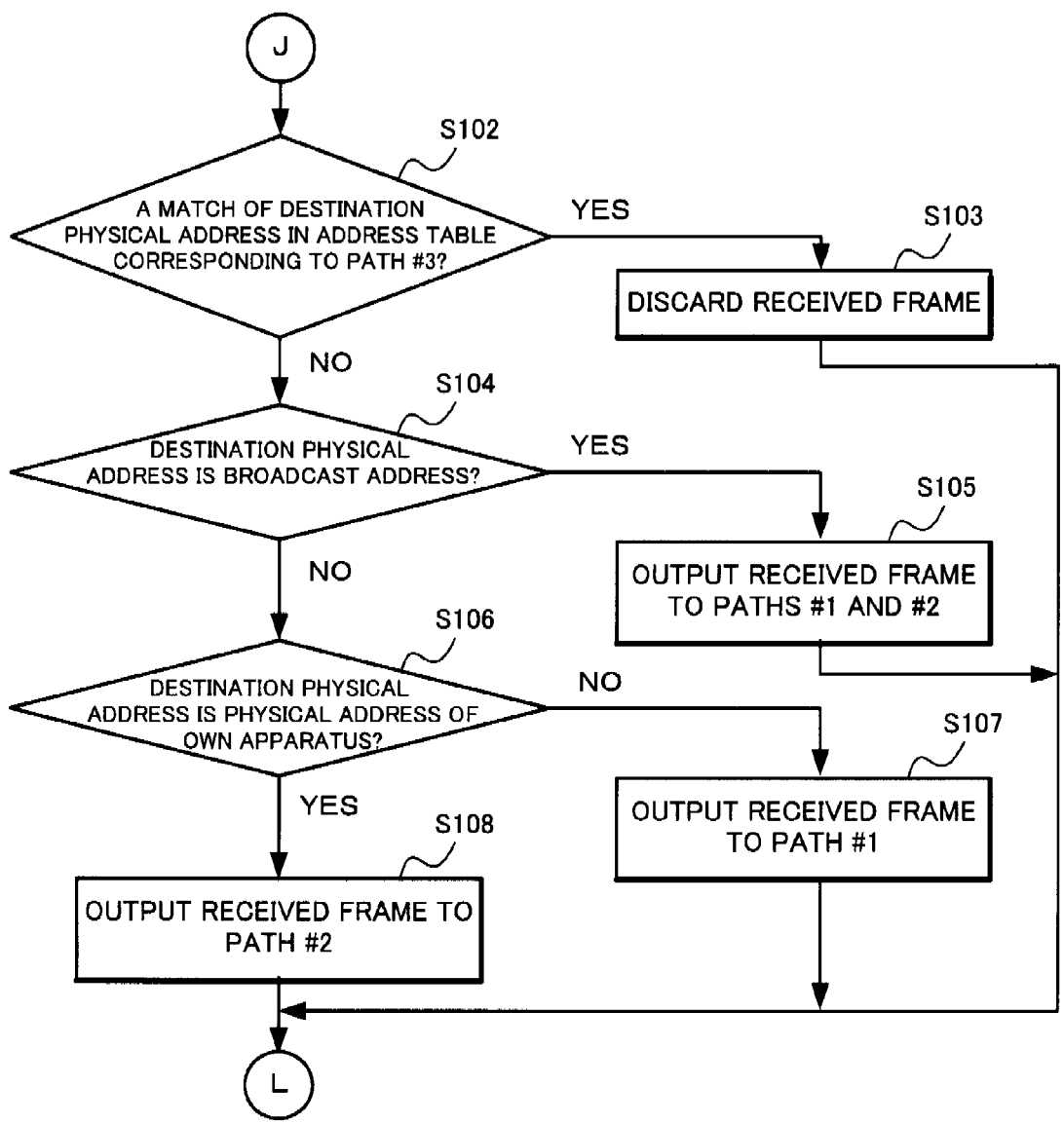
FIG. 26 is a flow chart showing the frame sorting process performed by the frame sorting part according to the fifth exemplary embodiment of the present invention.

When a frame is input through the path #3 (step S91 in FIG. 24), and if the destination physical address of the frame matches any of the addresses stored in the path #3 address table 163 (step S102 in FIG. 26), the frame sorting part 11 discards the frame (step S103 in FIG. 26).

If the destination physical address of the frame is a broadcast address (step S104 in FIG. 26), the frame sorting part 11 outputs the frame to the local network 201 through the path #1 and to the kernel part 12 through the path #2 (step S105 in FIG. 26), because the frame is either a broadcast or multi-cast frame.

If the destination physical address of the frame is the physical address of own apparatus (step S106 in FIG. 26), the frame sorting part 11 outputs the frame to the kernel part 12 through the path #2 (step S108 in FIG. 26). If the destination physical address of the frame is neither a broadcast address nor the physical address of own apparatus (step S106 in FIG. 26), then the frame sorting part 11 outputs the frame to the local network 201 through the path #1 (step S107 in FIG. 26).

Thus, similarly to the above-described third exemplary embodiment of the present invention, the fifth exemplary embodiment can cause the tunneling apparatus 1 to operate such that unnecessary frames will be prevented from being transferred as well as to discard frames to be discarded, in addition to the effects provided by the above-described second exemplary embodiment of the present invention.

Frames to be discarded will be described below. This kind of frame 328 primarily occurs when the destination MAC address is the MAC address of a terminal existing within the local network 201. A situation where the terminal 4-3 connected to the local network 201 transmits a frame 328 to the terminal 4-M also connected to the local network 201 will be described below.

When a frame 328 is received by the terminal 4-M, it is also received by the frame sorting part 11 of the tunneling apparatus 1 through the physical interface (path #1). Since the destination MAC address is not the MAC address of own apparatus, the frame 328 is determined to be a non-tunnel frame and the destination MAC address is then checked. If the destination MAC address is stored in the path #1 address table 161, the frame 328 is determined to be a non-tunnel frame addressed to other terminal and is discarded by the frame sorting part 11.

If the destination MAC address has not yet been stored in the path #1 address table 161, the frame 328 is not discarded but is instead output to the path #3. This is a normal operation, which is needed to guarantee the reacheability of frames addressed to "MAC131" to the local network 202 even when, for example, the terminal 4-M connected to the local network 201 has been moved and connected to the local network 202; the reacheability is achieved by deleting the terminal 4-M's MAC address "MAC131" if it has not been registered for a pre-determined period of time in the path #1 address table 161.

Sixth Exemplary Embodiment

The sixth exemplary embodiment of the present invention will be described below. A network according to a sixth exemplary embodiment of the present invention has the same configuration as the network according to the above-described first exemplary embodiment of the present invention, and a tunneling apparatus comprising the network has the same functions and configuration as the tunneling apparatus according to the above-described first exemplary embodiment of the present invention. Therefore, these will be omitted from the description.

Figure 28:
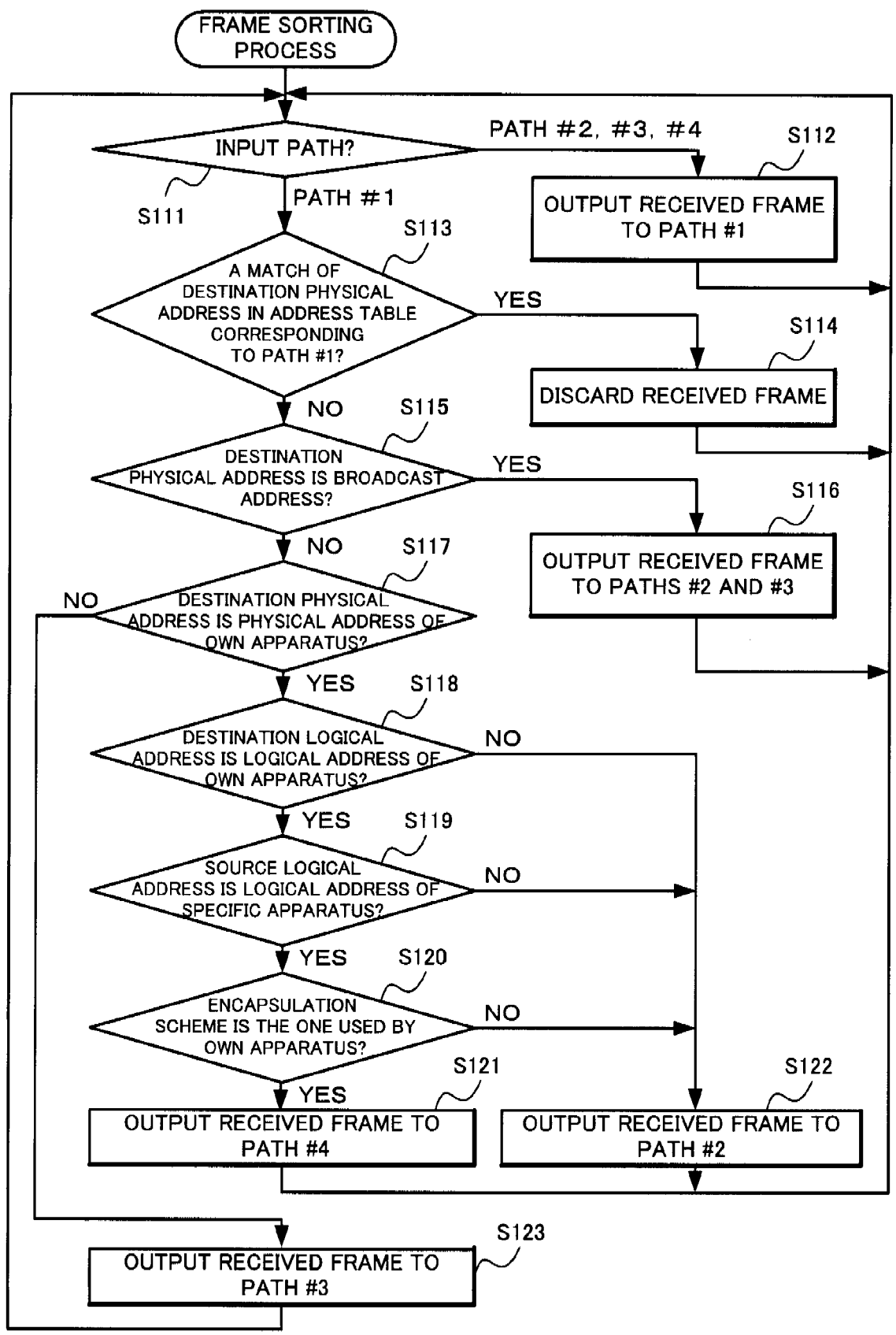
FIG. 28 is a flow chart showing the frame sorting process performed by a frame sorting part according to a sixth exemplary embodiment of the present invention.

FIG. 28 is a flow chart showing the frame sorting process performed by a frame sorting part according to the sixth exemplary embodiment of the present invention. The operation of the tunneling apparatus 1 according to the sixth exemplary embodiment of the present invention will now be described by referring to FIGS. 1 to 3 and FIG. 28. The process shown in FIG. 28 is achieved when the control program 15a is executed by the CPU 14.

In the sixth exemplary embodiment of the present invention, the frame sorting part 11 operates in such a manner to cause the tunneling apparatus 1 according to the above-described first exemplary embodiment of the present invention to discard frames to be discarded during the operation thereof. The operation during steps S111, S112, and S115 to S123 shown in FIG. 28 is the same as that during steps S1 to S11 shown in FIG. 5, because the frame sorting part 11 performs the same operation on frames input through the paths #1 to #4 as the above-described third exemplary embodiment of the present invention. Therefore, the process performed on frames input through the paths #1 to #4 will also be omitted from the description.

When a frame is input through the path #1 (step S111 in FIG. 28), and if the destination physical address of the frame matches any of the addresses stored in the path #1 address table 161 (step S113 in FIG. 28), the frame sorting part 11 discards the frame (step S114 in FIG. 28).

Thus, in addition to the effects provided by the above-described first exemplary embodiment of the present invention, the sixth exemplary embodiment can cause the tunneling apparatus 1 to discard frames to be discarded.

Seventh Exemplary Embodiment

Figure 29:
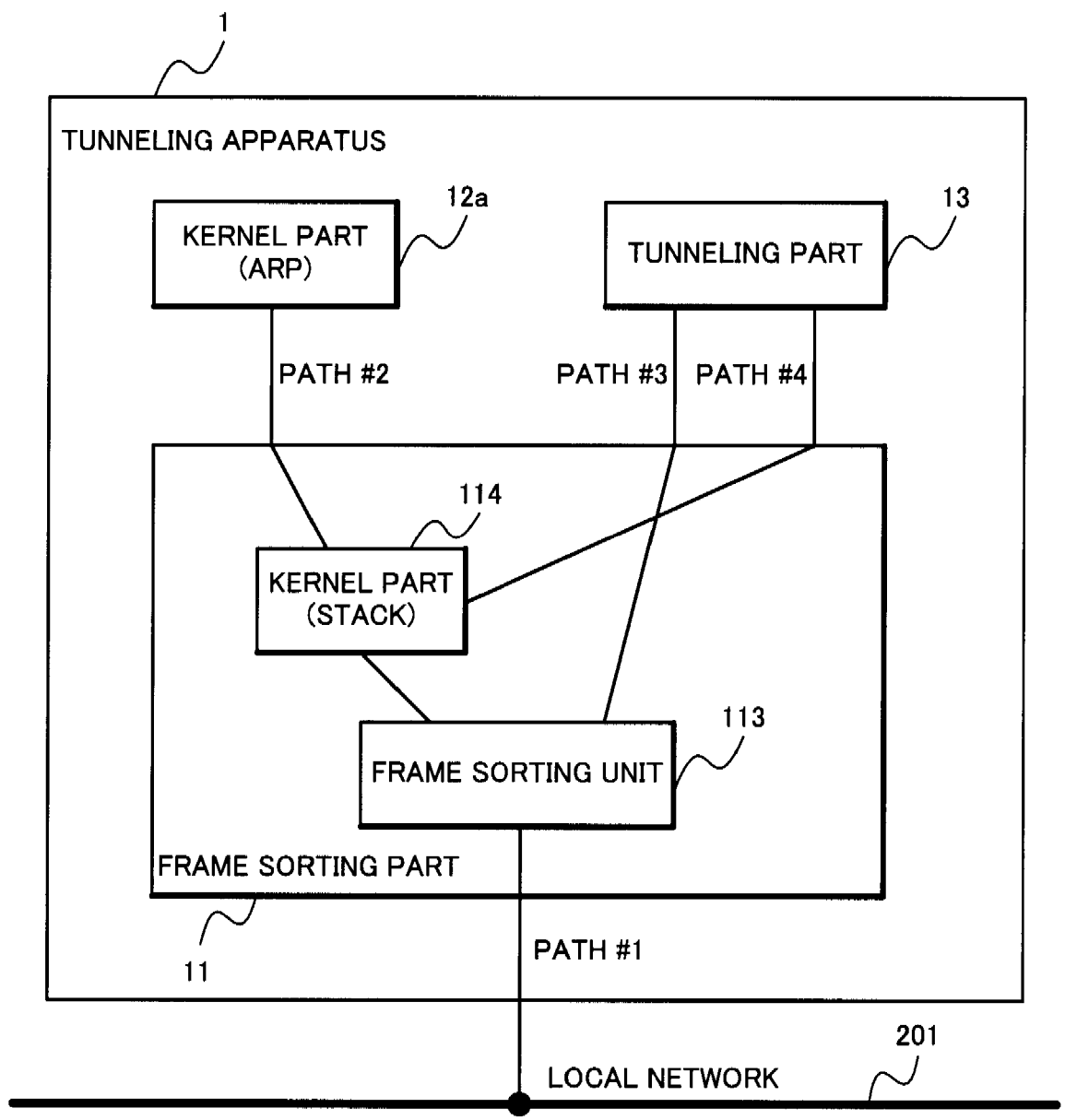
FIG. 29 is a block diagram showing the functional configuration of a tunneling apparatus according to a seventh exemplary embodiment of the present invention.
Figure 30:
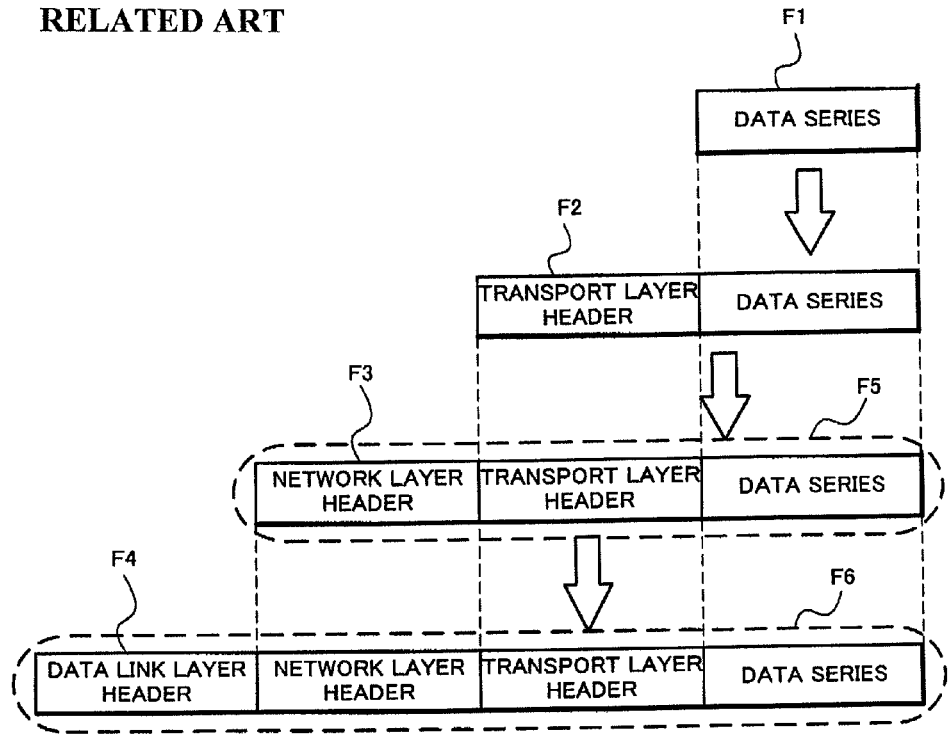
FIG. 30 is a diagram showing the format of a frame which is transmitted/received through a data link layer according to a related art.
Figure 31:
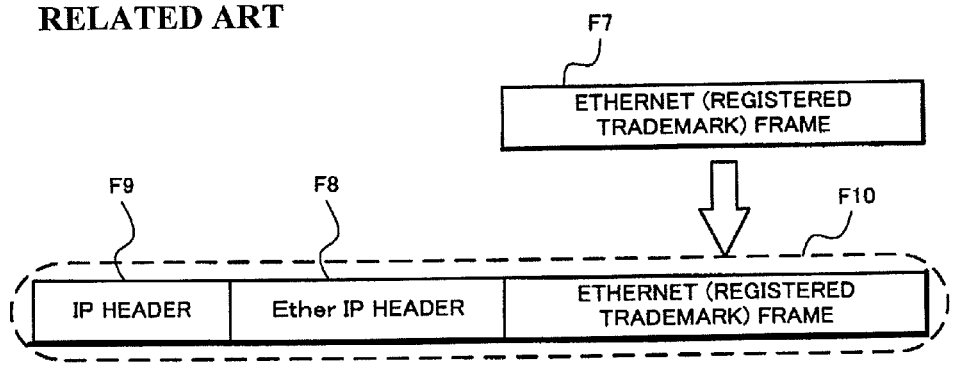
FIG. 31 is a diagram showing the format of EtherIP according to a related art.
Figure 32:
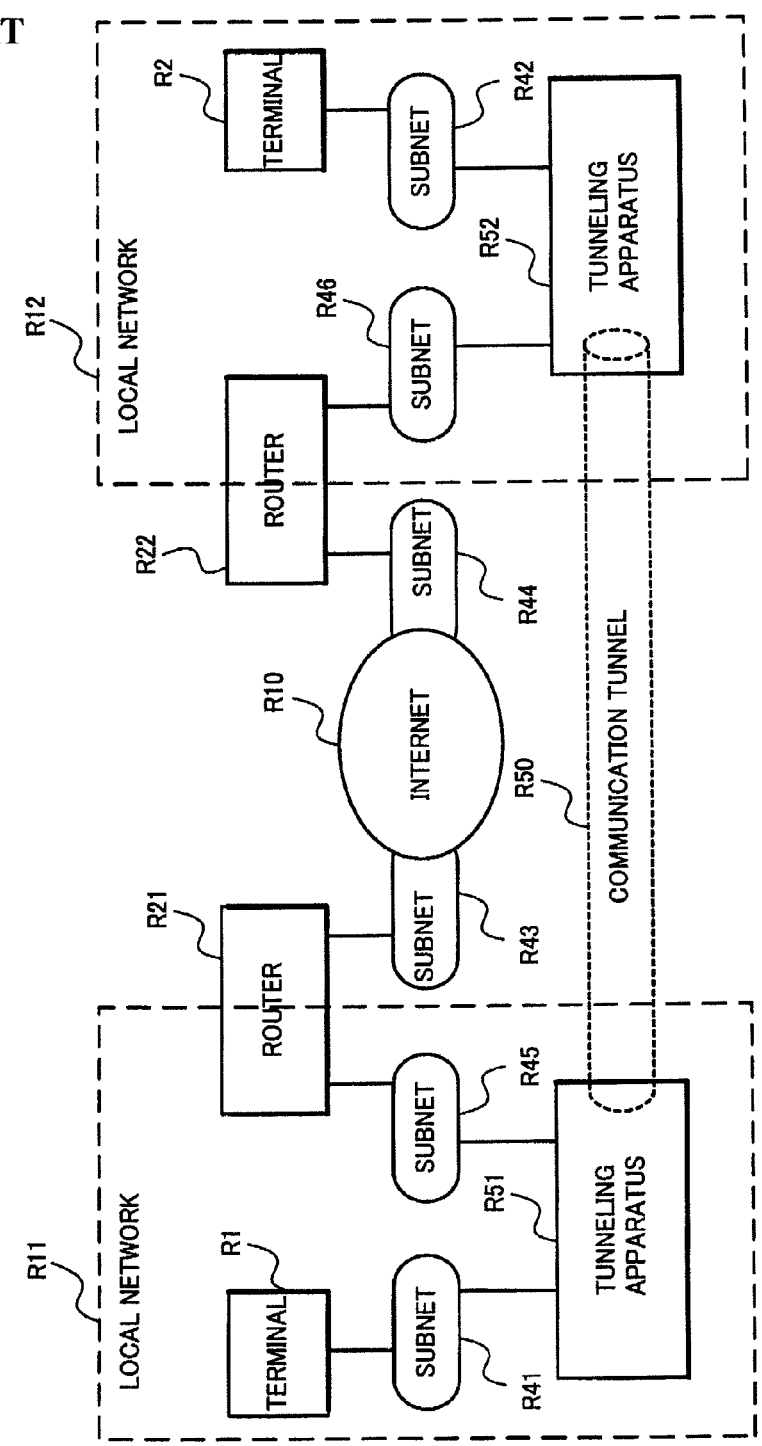
FIG. 32 is a block diagram showing the overall configuration of an information communication network according to a related art.

FIG. 29 is a block diagram showing the functional configuration of a tunneling apparatus according to a seventh exemplary embodiment of the present invention. As shown in FIG. 29, the tunneling apparatus 1 according to the seventh exemplary embodiment of the present invention comprises a frame sorting part 11, a kernel part (ARP) 12a, and a tunneling part 13. The frame sorting part 11 further comprises a frame sorting unit 113 and a kernel part (stack) 114.

The frame sorting unit 113 allocates frames input through the path #1 between the kernel part (stack) 114 and the path #3, frames input through the path #3 between the kernel part (stack) 114 and the path #1, and frames input through the kernel part (stack) 114 between the path #1 and the path #3. The kernel part (stack) 114 switches the path for frames input from the frame sorting unit 113 to the paths #2 and #4, the path for frames input through the path #2 to the frame sorting unit 113 and the path #4, the path for frames input through the path #4 to the frame sorting unit 113 and the path #2, and outputs these frames thereto, respectively.

This exemplary embodiment differs from the above-described exemplary embodiments only in the configuration of the frame sorting part 11; otherwise it operates similarly to the above-described exemplary embodiments and can provide the same effects as these examples. Therefore, these will be omitted from the description below.

The present invention is not limited to the configurations and operations of the exemplary embodiments, but can be implemented in any combination of thereof.

By adopting the configuration as described above for the tunneling apparatus, an exemplary embodiment of the present invention can properly sort data link layer frames which are input from the same interface into frames to be processed by own apparatus, frames to be transmitted after encapsulation, and frames to be transmitted after decapsulation and then perform encapsulation or decapsulation of frames and process frames, including physical address resolution request frames, to be processed by own apparatus, thereby making it possible to achieve the above-described exemplary objective.

In other words, although the above-described challenge can be resolved if encapsulation and decapsulation of frames are enabled by connecting only one physical interface to a local network, a resolution of such challenge cannot be attained unless frames are sorted properly because frames, including physical address resolution request frames, to be sent to the tunneling apparatus, frames to be decapsulated, and frames to be encapsulated are all received from the same interface.

By adopting the above-described configuration, it becomes possible for the tunneling apparatus of the present invention to connect only one physical interface to a local network, properly sort frames received from the same physical interface into frames to be processed by own apparatus, frames to be transmitted after encapsulation, frames to be transmitted after decapsulation, etc., process these frames accordingly, and transmit the resultant frames from the same physical interface, without requiring the network to be suspended or requiring the existing configuration of the local network to be modified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-059830, filed on Mar. 4, 2005, the disclosure of which is incorporated herein in its entirety by reference.

The invention claimed is:

1. A tunneling apparatus that establishes a tunnel to a second tunneling apparatus, the tunneling apparatus comprising:
a tunneling unit, which includes an encapsulation unit to encapsulate a frame into a packet and a decapsulation unit to decapsulate an encapsulated packet;
a kernel unit that processes a packet; and
a sorting unit connected to a network of the tunneling apparatus that allocates a packet received by the tunneling apparatus to at least one of the encapsulation unit, the decapsulation unit, and the kernel unit,
wherein said sorting unit receives a packet from a network, and
allocates the received packet to said decapsulation unit when a destination physical address of the packet is a physical address of the tunneling apparatus, a source logical address of the packet is a logical address of the second tunneling apparatus, and the packet has been encapsulated using an encapsulation method used by said encapsulation unit;
allocates the received packet to said kernel unit when the destination physical address of the packet is the physical address of the tunneling apparatus and the source logical address of the packet is not the logical address of the second tunneling apparatus and the packet has not been encapsulated using an encapsulation method used by the encapsulation unit;
allocates the received packet to said encapsulation unit when the destination physical address of the packet is not the physical address of the tunneling apparatus; and
allocates the received packet to said kernel unit and said encapsulation unit when said destination physical address of the packet is a broadcast address;
outputs a packet received from said kernel unit to at least one of said network and said encapsulation unit;
if the destination physical address of a packet received form said decapsulation unit is a broadcast address, outputs said packet to said network and said kernel unit;
if the destination physical address of said packet is said physical address of the tunneling apparatus, outputs said packet to said kernel unit; and
if the destination physical address of said packet is any address other than said physical address of the tunneling apparatus, outputs said packet to said network; and
outputs to said network a packet received from said encapsulation unit.

2. A tunneling apparatus to transmit/receive a frame which is a data series of a data link layer after encapsulation in tunneling with an other-party apparatus, comprising:
a tunneling unit which includes an encapsulation unit to encapsulate said frame into a packet which is a data series of a network layer and a decapsulation unit to decapsulate the encapsulated packet;
a kernel unit to process said frame; and
a sorting unit to sort and allocate said frame,
wherein said sorting unit receives frames from a network, and
outputs to said decapsulation unit first frames of the received frames, wherein a destination physical address of the first frames is a physical address of the tunneling apparatus, source logical addresses of the first frames are a logical address of said other-party apparatus, and the first frames have been encapsulated using an encapsulation method used by said encapsulation unit;
among the received frames other than said first frames, outputs to said kernel unit second frames having said physical address of the tunneling apparatus specified as the destination physical address;
among the received frames other than said first and second frames, outputs to said encapsulation unit third frames having any address other than said physical address of the tunneling apparatus specified as the destination physical address; and
among said third frames which have been output to said decapsulation unit, outputs to said kernel unit a fourth frame having a broadcast address specified as said destination physical address,
outputs a fifth frame received from said kernel unit to at least one of said network and said encapsulation unit;
if the destination physical address of a sixth frame received from said decapsulation unit is a broadcast address, outputs said sixth frame to said network and said kernel unit;
if the destination physical address of said sixth frame is said physical address of the tunneling apparatus, outputs said sixth frame to said kernel unit; and
if the destination physical address of said sixth frame is any address other than said physical address of the tunneling apparatus, outputs said sixth frame to said network; and outputs to said network a seventh frame received from said encapsulation unit.

3. A tunneling apparatus to transmit/receive a frame which is a data series of a data link layer after encapsulation in tunneling with an other-party apparatus, comprising:
   a tunneling unit which includes an encapsulation unit to encapsulate said frame into a packet which is a data series of a network layer and a decapsulation unit to decapsulate the encapsulated packet;
   a kernel unit to process said frame; and
   a sorting unit to sort and allocate said frame,
   wherein said sorting unit includes a transfer frame sorting unit and a kernel sorting unit, and said transfer frame sorting unit:
      outputs to said kernel sorting unit first frames received from a network and whose destination physical address is a physical address of the tunneling apparatus;
      among frames other than said first frames, outputs second frames to said encapsulation unit;
      among said second frames, outputs to said kernel sorting unit a third frame having a broadcast address specified as said destination physical address; and
   said kernel sorting unit:
      among said first frames received from said transfer frame sorting unit, outputs to said decapsulation unit a fourth frame, wherein a source logical address of is the logical address of said other-party apparatus and which has been encapsulated using an encapsulation method used by said encapsulation unit; and
      among other frames, outputs a fifth frame and the third frame to said kernel unit.

4. The tunneling apparatus according to claim 3, wherein said kernel sorting unit outputs a sixth frame received from said kernel unit to said transfer frame sorting unit; and
   said transfer frame sorting unit:
      outputs a sixth frame received from said kernel sorting unit to at least one of said network and said encapsulation unit;
      if the destination physical address of a seventh frame received from said decapsulation units is a broadcast address, outputs said seventh frame to said network and said kernel sorting unit;
      if the destination physical address of said seventh frame is said physical address of the tunneling apparatus, outputs said seventh frame to said kernel sorting unit;
      if the destination physical address of said seventh frame is any address other than said physical address of the tunneling apparatus, outputs said seventh frame to said network;
   outputs an eighth frame received from said encapsulation unit to said network; and
   said kernel sorting unit outputs said seventh frame to said kernel unit.

5. A tunneling apparatus to transmit/receive a frame which is a data series of a data link layer after encapsulation in tunneling with an other-party apparatus, comprising:
   a tunneling unit which includes an encapsulation unit to encapsulate said frame into a packet which is a data series of a network layer and a decapsulation unit to decapsulate the encapsulated packet;
   a kernel unit to process said frame; and
   a sorting unit to sort and allocate said frame,
   wherein said sorting unit includes a tunnel sorting unit and a switch unit, and said tunnel sorting unit:
      among frames received from a network, outputs to said decapsulation unit first frames, wherein a destination physical address is a physical address of the tunneling apparatus and a source logical address is a logical address of said other-party apparatus, and which has been encapsulated using an encapsulation method used by said encapsulation unit;
      among frames other than said first frames, outputs second frames to said switch unit; and
   said switch unit:
      based on the characteristics of the second frames received from said tunnel sorting unit, outputs to said kernel unit a third frame having said physical address of the tunneling apparatus specified as the destination physical address,
      outputs to said kernel unit and said encapsulation unit a fourth frame having a broadcast address specified as a destination physical address, and
      outputs to said encapsulation unit a fifth frame having any address other than said physical address of the tunneling apparatus specified as a destination physical address.

6. The tunneling apparatus according to claim 5, wherein said switch unit:
   outputs a sixth frame received from said kernel unit to at least one of said tunnel sorting unit and said encapsulation unit;
   if the destination physical address of a seventh frame received from said decapsulation unit is a broadcast address, outputs said seventh frame to said kernel unit and said tunnel sorting unit;
   if the destination physical address of said seventh frame is said physical address of the tunneling apparatus, outputs said seventh frame to said kernel unit; and
   if the destination physical address of said seventh frame is any address other than said physical address of the tunneling apparatus, outputs said seventh frame to said tunnel sorting unit; and
   said tunnel sorting unit outputs to said network an eighth frame received from said encapsulation unit and a ninth frame received from said switch unit.

7. A tunnel frame sorting method performed by a tunneling apparatus to transmit/receive a frame which is a data series of a data link layer after encapsulation in tunneling with a second tunneling apparatus, the method comprising:
   a tunneling process which includes an encapsulation process to encapsulate a frame into a packet and a decapsulation process to decapsulate an encapsulated packet;
   a kernel process to process a packet; and
   a sorting process to allocate a received packet,
   wherein said sorting process comprises:
      performing said decapsulation process on the received packet when a destination physical address of the packet is a physical address of the tunneling apparatus, a source logical address of the packet is a logical address of said second tunneling apparatus, and the packet has been encapsulated using an encapsulation method used by said encapsulation process;
      performing said kernel process on the received packet when the destination physical address of the packet is the physical address of the tunneling apparatus and the source logical address of the packet is not the logical address of the second tunneling apparatus and the packet has not been encapsulated using an encapsulation method used by the encapsulation unit;
      performing said encapsulation process on the received packet when the destination physical address of the packet is not the physical address of the tunneling apparatus; and performing said kernel process and said encapsulation process on the received packet when said destination physical address of the packet is a broadcast address;

one of outputting to said network a packet resulting from said kernel process and performing said encapsulation process thereon;

if the destination physical address of a packet resulting from said decapsulation process is a broadcast address, outputting said packet to said network and performing said kernel process thereon;

if the destination physical address of said packet is said physical address of the tunneling apparatus, performing said kernel process on said packet; and if the destination physical address of said packet is any address other than said physical address of the tunneling apparatus, outputting said packet to said network and outputting to said network a packet resulting from said encapsulation process.

8. A tunnel frame sorting method performed by a tunneling apparatus to transmit/receive a frame which is a data series of a data link layer after encapsulation in tunneling with an other-party apparatus, the method comprising:

a tunneling process which includes an encapsulation process to encapsulate said frame into a packet which is a data series of a network layer and a decapsulation process to decapsulate the encapsulated packet;

a kernel process to process said frame; and a sorting process on said frame, wherein said sorting process, among frames received from a network, comprises:

performing said decapsulation process on first frames among the received frames, wherein a destination physical address of the first frames is a physical address of the tunneling apparatus, source logical addresses of the first frames are a logical address of said other-party apparatus, and the first frames have been encapsulated using an encapsulation method used by said encapsulation process;

among the received frames other than said first frames, performing said kernel process on second frames having said physical address of the tunneling apparatus specified as the destination physical address;

performing said encapsulation process on third frames having any address other than said physical address of the tunneling apparatus specified as the destination physical address; and among said third frames, performing said kernel process on fourth frames having a broadcast address specified as said destination physical address, one of outputting to said network a fifth frame resulting from said kernel process and performing said encapsulation process thereon;

if the destination physical address of a sixth frame resulting from said decapsulation process is a broadcast address, outputting said sixth frame to said network and performing said kernel process thereon;

if the destination physical address of said sixth frame is said physical address of the tunneling apparatus, performing said kernel process on said sixth frame; and if the destination physical address of said sixth frame is any address other than said physical address of the tunneling apparatus, outputting said sixth frame to said network and outputting to said network a seventh frame resulting from said encapsulation process.

9. A tunnel frame sorting method performed by a tunneling apparatus to transmit/receive a frame which is a data series of a data link layer after encapsulation in tunneling with an other-party apparatus, the method comprising:

a tunneling process which includes an encapsulation process to encapsulate said frame into a packet which is a data series of a network layer and a decapsulation process to decapsulate the encapsulated packet;

a kernel process to process said frame; and a sorting process on said frame, wherein said sorting process includes a transfer frame sorting process and a kernel sorting process, and said transfer frame sorting process:

performs said kernel sorting process on first frames received from a network and whose destination physical address is a physical address of the tunneling apparatus;

among frames other than said first frames, performs said encapsulation process on second frames;

among said second frames, performs said kernel sorting process on a third frame having a broadcast address specified as said destination physical address; and said kernel sorting process:

among said first frames resulting from said transfer frame sorting process, performs said decapsulation process on a fourth frame, wherein a destination physical address is said physical address of the tunneling apparatus and a source logical address is the logical address of said other-party apparatus and which has been encapsulated using an encapsulation method used by said encapsulation process, and, among other frames, performs said kernel process on a fifth frame and performs said kernel process on the third frame.

10. The tunnel frame sorting method according to claim 9, wherein said kernel sorting process performs said transfer frame sorting process on a sixth frame resulting from said kernel process; and said transfer frame sorting process:

one of outputs to said network the sixth frame resulting from said kernel process and performs said encapsulation process thereon;

if the destination physical address of a seventh frame resulting from said decapsulation process is a broadcast address, outputs said seventh frame to said network and performs said kernel sorting process thereon;

if the destination physical address of said seventh frame is said physical address of the tunneling apparatus, performs said kernel sorting process on said seventh frame; and if the destination physical address of said seventh frame is any address other than said physical address of the tunneling apparatus, outputs said seventh frame to said network and outputs to said network an eighth frame resulting from said encapsulation process; and said kernel sorting process performs said kernel process on said seventh frame.

11. A tunnel frame sorting method performed by a tunneling apparatus to transmit/receive a frame which is a data series of a data link layer after encapsulation in tunneling with an other-party apparatus, the method comprising:

a tunneling process which includes an encapsulation process to encapsulate said frame into a packet which is a data series of a network layer and a decapsulation process to decapsulate the encapsulated packet;

a kernel process to process said frame; and a sorting process on said frame, wherein said sorting process includes a tunnel sorting process and a switch process, and said tunnel sorting process:
among frames received from a network, performs said decapsulation process on first frames, wherein a destination physical address is a physical address of the tunneling apparatus and a source logical address is a logical address of said other-party apparatus, and which has been encapsulated using an encapsulation method used by said encapsulation process;
among frames other than said first frames, performs said switch process on second frames; and
said switch process:
based on the characteristics of the second frames resulting from said tunnel sorting process, performs said kernel process on a third frame having said physical address of the tunneling apparatus specified as a destination physical address,
performs said kernel process and said encapsulation process on a fourth frame having a broadcast address specified as a destination physical address, and
performs said encapsulation process on a fifth frame having any address other than said physical address of the tunneling apparatus specified as a destination physical address.

12. The tunnel frame sorting method according to claim 11, wherein said switch process:
performs on a sixth frame resulting from said kernel process at least one of said tunnel sorting process and said encapsulation process;
if the destination physical address of an eighth frame resulting from said decapsulation process is a broadcast address, performs said kernel process and said tunnel sorting process on said seventh frame;
if the destination physical address of said eighth frame is said physical address of the tunneling apparatus, performs said kernel process on said seventh frame; and
if the destination physical address of said seventh frame is any address other than said physical address of the tunneling apparatus, performs said tunnel sorting process on said seventh frame; and
said tunnel sorting process outputs to said network the eighth frame resulting from said encapsulation process and a ninth frame resulting from said switch process.

13. A non-transitory computer-readable recording medium having a program embodied thereon which, in tunneling between an tunneling apparatus and a second tunneling apparatus, realizes tunnel frame sorting to transmit/receive a frame which is a data series of a data link layer after encapsulation, the program causing the computer to execute a method comprising:
a tunneling process which includes an encapsulation process to encapsulate a frame into a packet and a decapsulation process to decapsulate the encapsulated packet;
a kernel process to process a packet; and
a sorting process to allocate a received packet,
wherein said sorting process comprises:
performing said decapsulation process on the received packet when a destination physical address of the packet is a physical address of the tunneling apparatus, a source logical address of the packet is a logical address of said second tunneling apparatus, and the packet has been encapsulated using an encapsulation method used by said encapsulation process;
performing said kernel process on the received packet when the destination physical address of the packet is the physical address of the tunneling apparatus and the source logical address of the packet is not the logical address of the second tunneling apparatus and the packet has not been encapsulated using an encapsulation method used by the encapsulation unit;
performing said encapsulation process on the received packet when the destination physical address of the packet is not the physical address of the tunneling apparatus;
performing said kernel process and said encapsulation process on the received packet when said destination physical address of the packet is a broadcast address;
one of outputting to said network a packet resulting from said kernel process and performing said encapsulation process thereon;
if the destination physical address of a packet resulting from said decapsulation process is a broadcast address, outputting said packet to said network and performing said kernel process thereon;
if the destination physical address of said packet is said physical address of the tunneling apparatus, performing said kernel process on said packet; and
if the destination physical address of said packet is any address other than said physical address of the tunneling apparatus, outputting said packet to said network and outputting to said network a packet resulting from said encapsulation process.

14. A non-transitory computer-readable recording medium having a program embodied thereon which, in tunneling between a tunneling apparatus and an other-party apparatus, realizes tunnel frame sorting to transmit/receive a frame which is a data series of a data link layer after encapsulation, the program causing the computer to execute a method comprising:
a tunneling process which includes an encapsulation process to encapsulate said frame into a packet which is a data series of a network layer and a decapsulation process to decapsulate the encapsulated packet;
a kernel process to process said frame; and
a sorting process on said frame,
wherein said sorting process includes a transfer frame sorting process and a kernel sorting process, and said transfer frame sorting process:
performs said kernel sorting process on first frames received from a network and whose destination physical address is a physical address of the tunneling apparatus;
among frames other than said first frames, performs said encapsulation process on second frames;
among said second frames, performs said kernel sorting process on a third frame having a broadcast address specified as said destination physical address; and
said kernel sorting process:
among said first frames resulting from said transfer frame sorting process, performs said decapsulation process on a fourth frame, wherein a destination physical address is said physical address of the tunneling apparatus and a source logical address is the logical address of said other-party apparatus and which has been encapsulated using an encapsulation method used by said encapsulation process, and,
among other frames, performs said kernel process on a fifth frame.

15. A non-transitory computer-readable recording medium having a program embodied thereon which, in tunneling between a tunneling apparatus and an other-party apparatus, realizes tunnel frame sorting to transmit/receive a frame which is a data series of a data link layer after encapsulation, the program causing the computer to execute a method comprising:

a tunneling process which includes an encapsulation process to encapsulate said frame into a packet which is a data series of a network layer and a decapsulation process to decapsulate the encapsulated packet;

a kernel process to process said frame; and a sorting process on said frame, wherein said sorting process includes a tunnel sorting process and a switch process, and said tunnel sorting process:

among frames received from a network, performs said decapsulation process on first frames, wherein a destination physical address is a physical address of the tunneling apparatus and a source logical address is a logical address of said other-party apparatus, and which has been encapsulated using an encapsulation method used by said encapsulation process;

among frames other than said first frames, performs said switch process on second frames; and said switch process:

based on the characteristics of the second frames resulting from said tunnel sorting process, performs said kernel process on a third frame having said physical address of the tunneling apparatus specified as a destination physical address, performs said kernel process and said encapsulation process on a fourth frame having a broadcast address specified as a destination physical address, and performs said encapsulation process on a fifth frame having any address other than said physical address of the tunneling apparatus specified as a destination physical address.

* * * * *